(12) United States Patent
Babuka

(10) Patent No.: US 11,708,193 B2
(45) Date of Patent: Jul. 25, 2023

(54) MULTIPURPOSE TOOL AND STORAGE DEVICE

(71) Applicant: Adam Babuka, Battle Ground, WA (US)

(72) Inventor: Adam Babuka, Battle Ground, WA (US)

( * ) Notice: Subject to any disclaimer, the term of this patent is extended or adjusted under 35 U.S.C. 154(b) by 208 days.

(21) Appl. No.: 16/915,011

(22) Filed: Jun. 29, 2020

(65) Prior Publication Data

US 2020/0407116 A1    Dec. 31, 2020

Related U.S. Application Data

(60) Provisional application No. 62/868,853, filed on Jun. 28, 2019.

(51) Int. Cl.
| | | |
|---|---|---|
| *A45F 3/04* | (2006.01) | |
| *B65D 25/24* | (2006.01) | |
| *B01D 35/027* | (2006.01) | |
| *A45F 4/02* | (2006.01) | |
| *A45F 3/00* | (2006.01) | |

(52) U.S. Cl.
CPC .............. *B65D 25/24* (2013.01); *A45F 3/04* (2013.01); *A45F 4/02* (2013.01); *B01D 35/027* (2013.01); *A45F 2003/003* (2013.01)

(58) Field of Classification Search
CPC ......... A45C 2200/15; A45C 9/00; A47B 3/10; A47B 2023/005; B65D 25/24
See application file for complete search history.

(56) References Cited

U.S. PATENT DOCUMENTS

| | | | |
|---|---|---|---|
| 3,565,277 A | 2/1971 | Sidney | |
| 3,802,613 A | 4/1974 | Droeger | |
| 3,980,216 A | 9/1976 | Nye | |
| 4,310,110 A | 1/1982 | Dexter | |
| D269,307 S | 6/1983 | Laughlin | |
| 4,574,594 A * | 3/1986 | Simmons | A47B 3/0818 62/457.1 |
| 5,120,437 A * | 6/1992 | Williams | C02F 1/444 210/244 |
| D355,297 S | 2/1995 | Ash, Jr. | |

(Continued)

FOREIGN PATENT DOCUMENTS

| | | | | |
|---|---|---|---|---|
| DE | 202007006771 U1 * | 9/2007 | | B01D 61/18 |
| EP | 1757200 A1 * | 2/2007 | | A45C 9/00 |

OTHER PUBLICATIONS

Trailhungry.com [online], "UKA by Tarilhungry LLC," published Jan. 12, 2018, [Retrieved on Nov. 20, 2020], retrieved from: URL<https://trailhungry.com/>, 2 pages.

*Primary Examiner* — Scott T McNurlen
(74) *Attorney, Agent, or Firm* — Fish & Richardson P.C.

(57) ABSTRACT

A multipurpose tool and storage device is disclosed. In one aspect, the multipurpose tool and storage device can include a container. The container can includes a frontward wall portion, a rearward wall portion, a first sidewall portion, a second sidewall portion, an inner bottom surface of the container, and a plurality of leg storage compartments that are each configured to stow a removable leg of the container, wherein each leg storage compartment of the plurality of leg storage compartments is positioned between a terminating end of the rearward sidewall portion and a terminated end of at least one of the first sidewall portion or the second sidewall portion.

11 Claims, 28 Drawing Sheets

(56) References Cited

U.S. PATENT DOCUMENTS

| | | | |
|---|---|---|---|
| 5,447,261 A * | 9/1995 | Mitomi | A45C 5/14 |
| | | | 190/18 R |
| 5,462,213 A | 10/1995 | Watt | |
| 5,465,213 A | 11/1995 | Ross | |
| 6,830,170 B2 | 12/2004 | Abel | |
| D506,865 S | 7/2005 | Hornsher et al. | |
| 7,514,006 B1 * | 4/2009 | Lundquist | C02F 1/002 |
| | | | 210/780 |
| D659,993 S | 5/2012 | Lindstrom | |
| D699,031 S | 2/2014 | Clavette et al. | |
| D702,041 S | 4/2014 | Wu | |
| 8,910,956 B2 * | 12/2014 | Bengtzen | B62B 1/186 |
| | | | 280/30 |
| D746,584 S | 1/2016 | McDonald | |
| D756,050 S | 5/2016 | Lavoie | |
| D871,056 S | 12/2019 | Babuka | |
| 2002/0088834 A1 | 7/2002 | Wolfgram | |
| 2004/0238552 A1 | 12/2004 | Young | |
| 2007/0205234 A1 | 9/2007 | Lessmann | |
| 2012/0152811 A1 * | 6/2012 | Wright | C02F 1/002 |
| | | | 210/104 |
| 2013/0043158 A1 * | 2/2013 | Flood, II | A63B 47/00 |
| | | | 206/579 |
| 2022/0087384 A1 * | 3/2022 | Bromley | A45C 13/28 |

\* cited by examiner

US 11,708,193 B2

MULTIPURPOSE TOOL AND STORAGE DEVICE

CROSS-REFERENCE TO RELATED APPLICATIONS

This application claims the benefit of U.S. Provisional Patent Application No. 62/868,853 filed Jun. 28, 2019, the entire contents of which is hereby incorporated by reference in its entirety.

BACKGROUND

Backpacks can be used to carry items on a back of a person.

SUMMARY

The present disclosure is directed towards a multipurpose tool and storage device ("multipurpose tool") for use by a person during excursions away from home. Excursions away from home may include, for example, a day trip, a field trip, a hiking trip, a camping trip, an extended stay in the wilderness, or any other journey away from home or a home base of operations (e.g., a campsite).

In some implementations, the multipurpose tool is configured to be easily insertable into a bag such as a hiking backpack for transport from the person's home (or home base of operations) during the excursion. For example, the multipurpose tool can be manufactured to have features that facilitate ease of insertion or removal of the multipurpose tool to or from a bag. These features can include rounded edges, coupling units that are indented, leg storage compartments, leg coupling units, or any combination thereof, that are each configured to reduce snags when inserting the multipurpose tool into a bag. The multipurpose tool, when inserted into a bag such as a hiking backpack, may create a storage compartment inside the bag that can be used to stow items the person wants to take on an excursion. This storage compartment can provide rigid walls that protect the items that reside within the storage compartment (e.g., fish caught by the user while fishing) and also protect a person wearing the bag from any items that may reside within the container (e.g., a sharp knife, firewood, fishing hooks, etc).

In some implementations, a bag such as a hiking backpack may be manufactured to include particular features that improve the ease with which the multipurpose tool can be inserted to or removed from the bag. These features can include one or more skids that enable the multipurpose tool to be easily inserted into and removed from the bag. The skids enable easy insertion of the multipurpose tool into, and removal from, a bag by reducing friction that occurs when sliding the multipurpose tool into the bag. In addition, the skids may also be used to avoid snags that may occur when sliding the multipurpose tool into the bag. Together bag with skids and the multipurpose tool create backpack system that is to use for storing and carrying items in the bag during an excursion away from home.

However, the benefits of the multipurpose tool are not limited to creation of a storage compartment inside a bag. Instead, the multipurpose tool provides other advantages. For example, the multipurpose tool may be used as a container for a container for obtaining water from a water source (e.g., a stream, a lake, a stream, or the like), a container for storing water, a water measuring device, water filtration system, a carrying device for carrying items such as firewood, a fishing device, a seat, a table, a cutting board, among others. Features of the multipurpose tool that enable each of these use cases, and other use cases, are described in more detail below.

DETAILED DESCRIPTION

Figure 1:
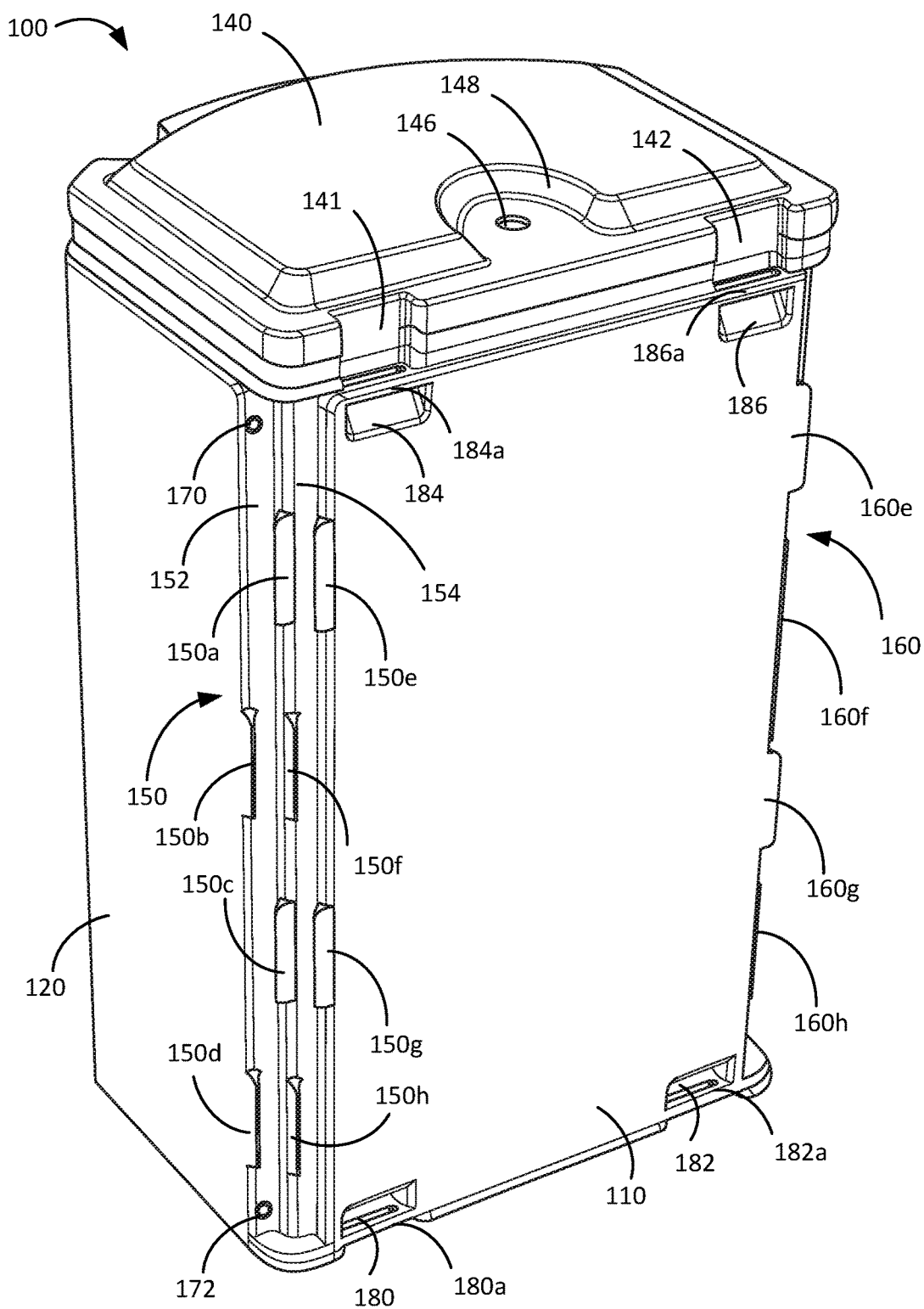
FIG. 1 is an illustration of a rearward perspective view of a first sidewall portion of an example of a capped multipurpose tool and storage device without legs stowed.
Figure 3:
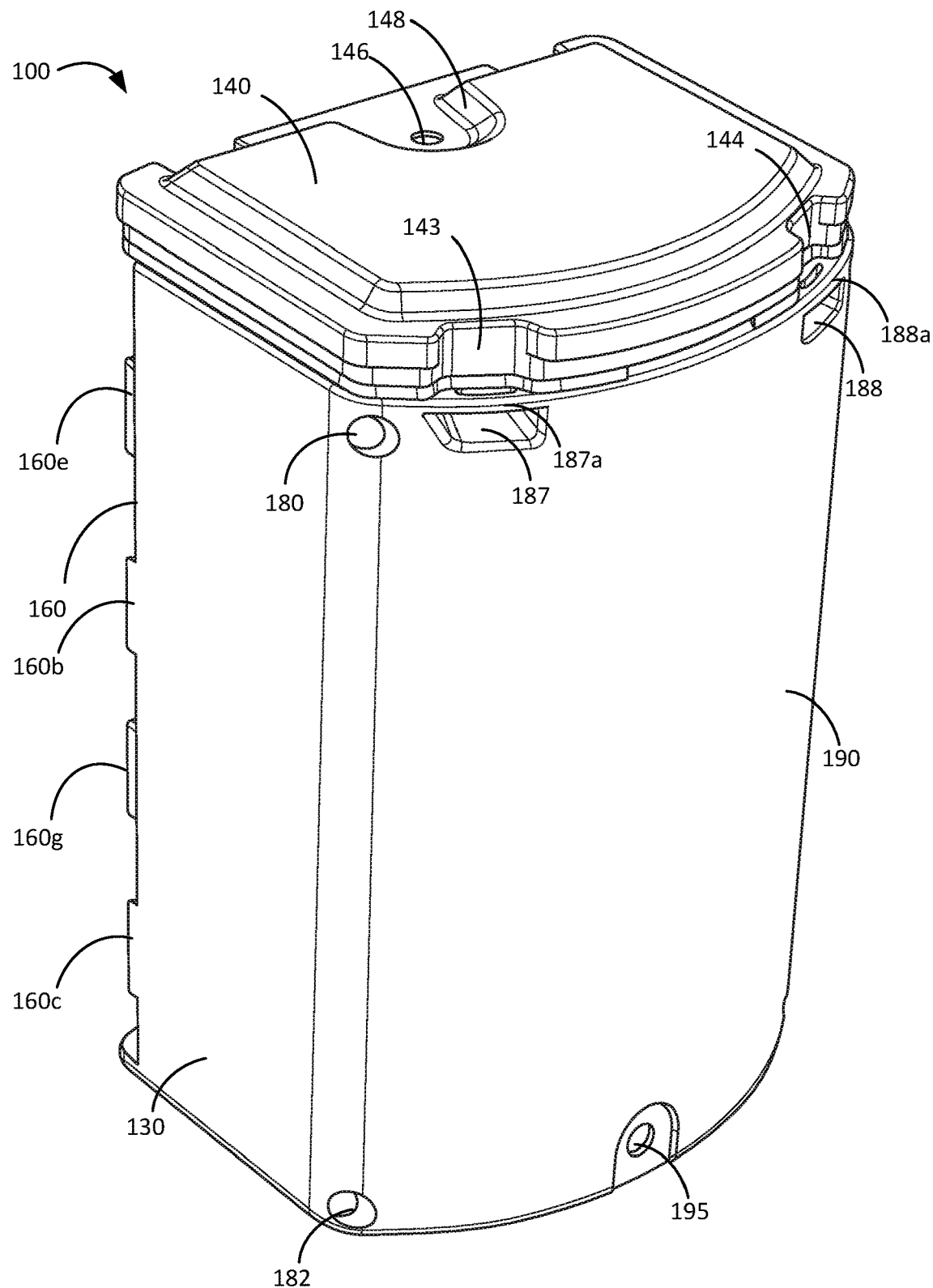
FIG. 3 is an illustration of a forward perspective view of a second sidewall portion of an example of a capped multipurpose tool and storage device without legs stowed.
Figure 4:
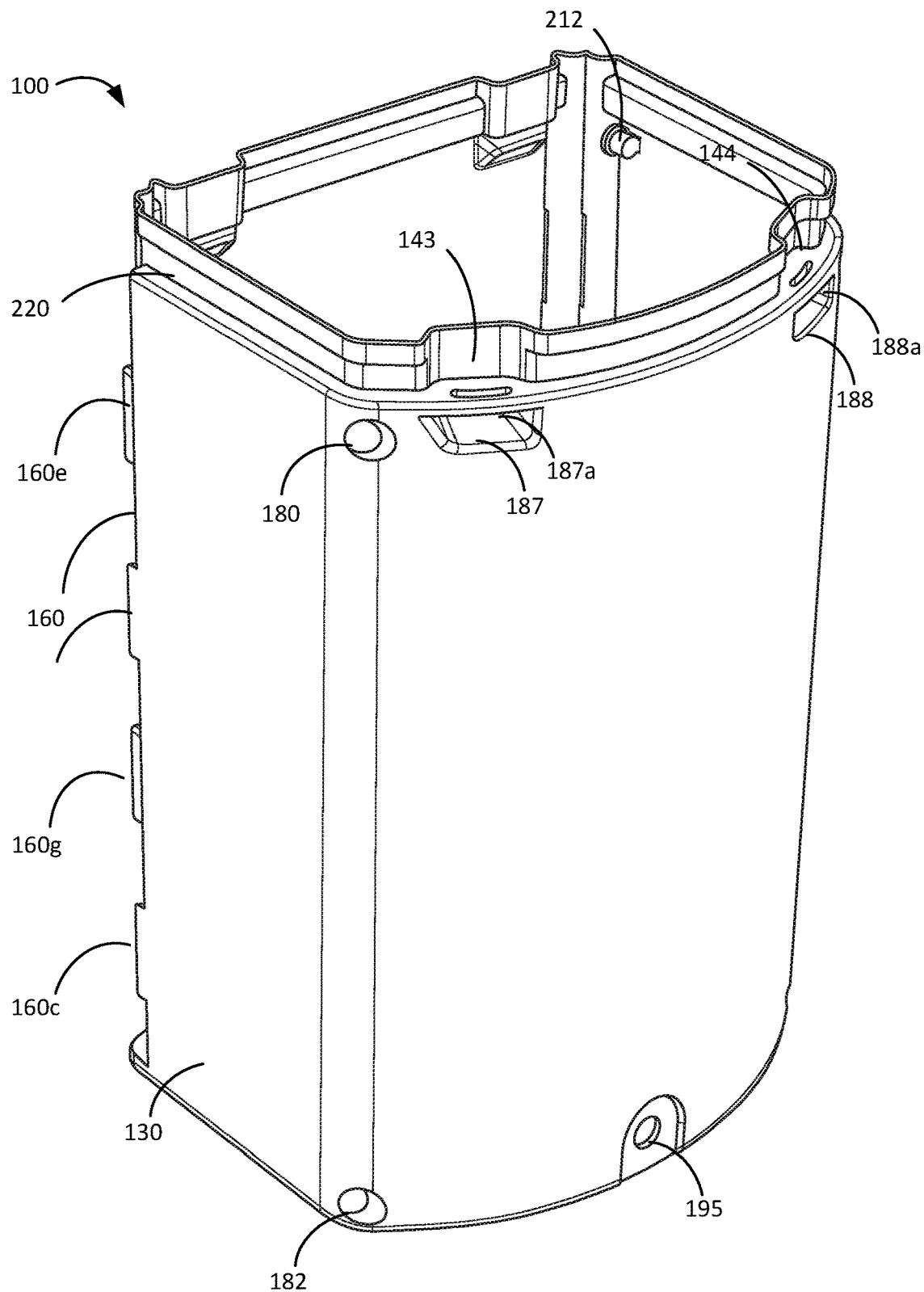
FIG. 4 is an illustration of a forward perspective view of a second sidewall portion of an example of an uncapped multipurpose tool and storage device without legs stowed.

FIG. 1 is a rearward perspective view of a first sidewall portion 120 of an example of a capped multipurpose tool 100 without legs stowed. The multipurpose tool 100 includes a rearward wall portion 110, a first sidewall portion 120, a second sidewall portion 130 (shown in at least FIGS. 3, 4, 5), a lid 140, a first leg storage unit 150, and a second leg storage unit 160.

The rearward wall portion 110 may include a substantially flat surface area. In some implementations, the rearward wall portion 110 may be composed of the same material throughout. For example, in some implementations, the rearward wall portion 110 may be molded from plastic that is non-transparent. In other implementations, rearward wall portion 110 may be composed of multiple different types of material. For example, in some implementations, the rearward wall portion 110 may be composed of a first portion that is non-transparent and another portion that is transparent. Implementations of a multipurpose tool 100 having a transparent portion of the rearward wall portion 110 may enable a person using the multipurpose tool 100 to see what is inside the multipurpose tool 100 without opening a lid 140 of the multipurpose tool 100.

In some implementations, the rearward wall portion 110 may be configured so that at least a portion of the rearward wall portion includes one or more utility tools such as a cutting board. The cutting board may be composed of plastic or any other material that is suitable for use as a cutting board. For example, in some implementations, at least a portion of the rearward wall portion 110 may include plastic and another portion of the rearward wall portion 110 may be composed of wood that may be used as a cutting board. In yet other implementations, the entire portion of the rearward wall portion 110 may be composed of a material that is suitable for use as a cutting board such as plastic, wood, rubber, or the like.

Figure 16:
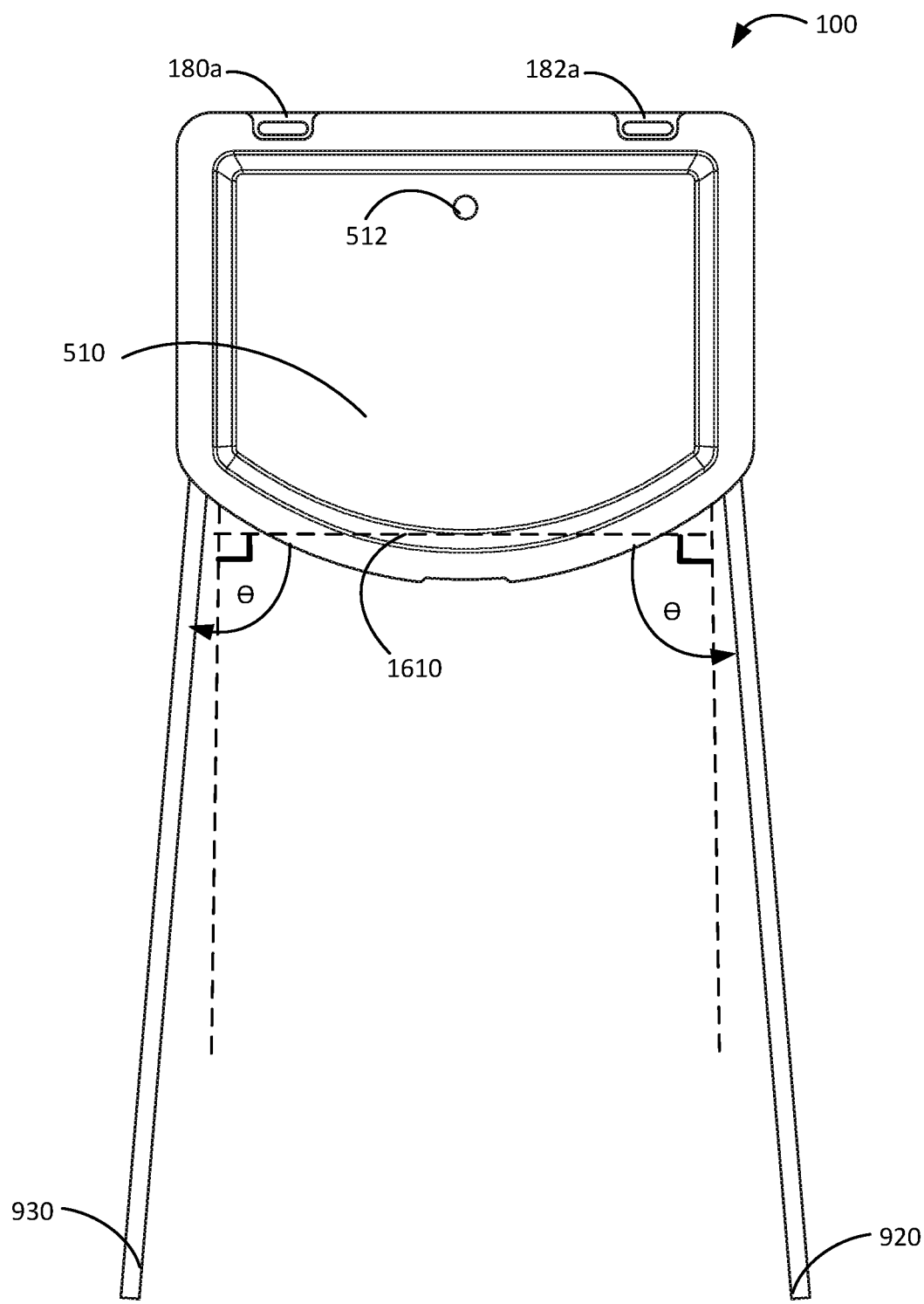
FIG. 16 is an illustration of a bottom view of an example of a multipurpose tool and storage device with legs installed.
Figure 17:
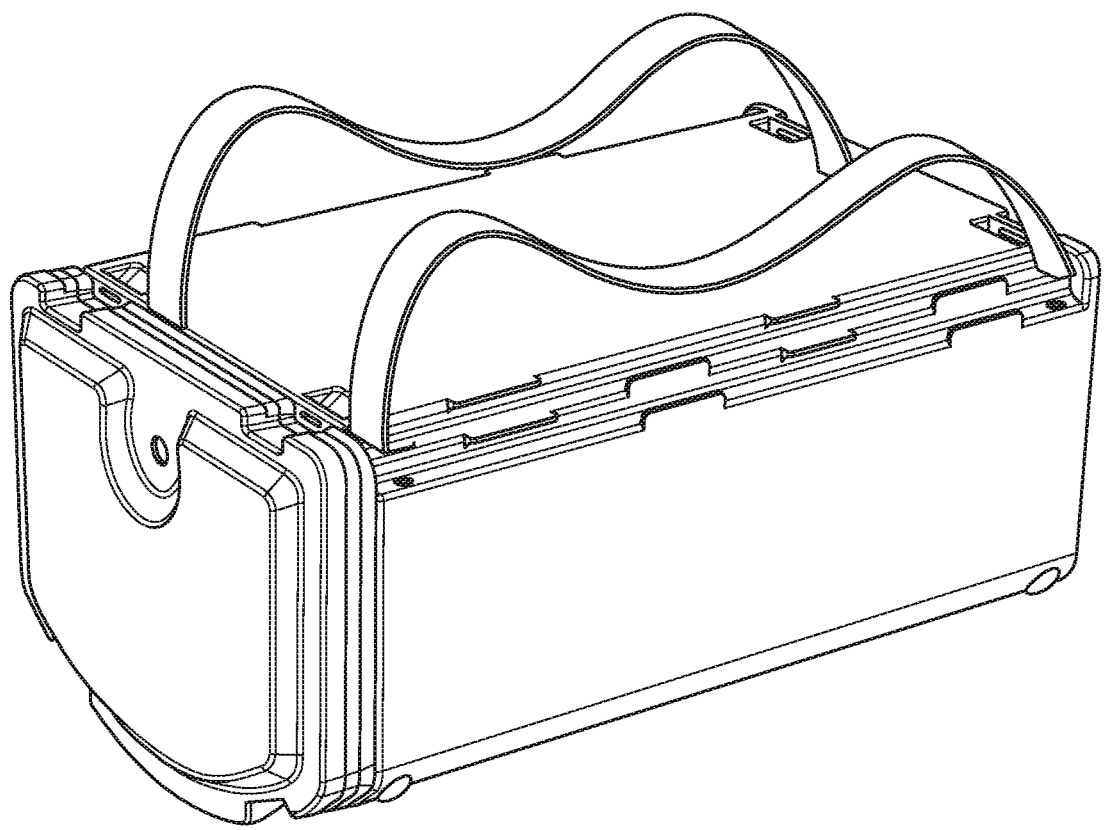
FIG. 17 is an illustration of a horizontal perspective view of an example of a multipurpose tool with straps attached.

The rearward wall portion 110 may also include one or more coupling units 180a, 182a, 184a, 186a that are built into the rear wall portion 110 using one or more recesses 180, 182, 184, 186. Each coupling unit 180a, 182a, 184a, 186a is configured to releasably engage an end of a strap (as shown in FIGS. 16 and 17). Each respective recess 180, 182, 184, 186 can be used to enable an end of a strap to access the coupling unit housed by the recess. In some implementations, a recess such as recess 180 may be used to store at least a portion of a strap that has been coupled to the coupling unit 180a. This provides the benefit of allowing a person to couple straps to the multipurpose tool in a manner that enables the multipurpose tool 100 to be used as a back-pack without the ends of each respective strap digging into the person's back. This benefit is achieved because of the recesses 180, 182, 184, 186.

In some implementations, the coupling units can include pins that can be installed within the recesses 180, 182, 184, 186, 187, 188 at a later point in time after the initial manufacture of the multipurpose tool 100. In such instances, appropriate steps may be taken to sufficiently seal and waterproof the points where the pins that are coupled to the multipurpose tool 100. The multipurpose tool 100 itself may be manufactured from any number of materials, alone or in combination, including, for example, plastic, neoprene, rubber, aluminum, steel, titanium, wood, or the like.

The multipurpose tool 100 can include a plurality of leg storage units 150, 160. The first leg storage unit 150 is located at the intersection of a plane that extends from an edge of the rearward wall portion 110 and a plane that extends from an edge of the first sidewall portion 120. The second leg storage unit 160 is located at the intersection of a plane that extends from an edge of the rearward sidewall portion 110 and a plane that extends from an edge of the second sidewall portion 130 (shown in at least FIGS. 3, 4, 5). Each of the respective leg storage units 150, 160 can be used to stow one or more legs 910, 920, 930, 940 that can be used to transform the multipurpose tool 100 into a table, a seat, or the like. FIG. 1 depicts an example of a multipurpose storage container 100 that does not stow any legs in the leg storage units 150, 160. However, the legs 910, 920, 930 are shown stowed in the leg storage units 150, 160 in FIG. 9 and leg 940 is shown stowed in a leg storage unit in FIG. 10.

The first leg storage unit 150 includes a first channel 152 and a second channel 154, and a plurality of leg storage tabs 150a, 150b, 150c, 150d, 150e, 150f, 150g, 150h. Each of the respective channels is configured to receive one of legs 910, 920, 930, 940 that may be stored in the leg storage units 150, 160. A leg such as one of legs 910, 920, 930, 940 can be stored in the leg storage unit 150 using the plurality of leg storage tabs 150a, 150b, 150c, 150d, 150e, 150f, 150g, 150h to secure the leg 910, 920, 930, 940. For example, the plurality of leg storage tabs 150a, 150b, 150c, 150d, 150e, 150f, 150g, 150h can be configured to removably engage a leg that has been stowed in a channel of the leg storage unit 150.

A leg 910 can be placed into a leg storage unit such as leg storage unit 150 by aligning the leg 910 with a corresponding channel such as the first channel 152 and applying a first force to the leg 910 in the direction of the multipurpose tool 100. The first force must exceed a threshold amount of force that is great enough to cause one or more of the leg storage tabs 150a, 150b, 150c, 150d, 150e, 150f, 150g, 150h to adjust from a first position to a second position. By way of example, in the first position, an opening between respective leg storage tabs 150a, 150b, 150c, 150d is not big enough to allow the leg 910 to move into a channel 152 or out of the channel 152. However, one or more of the tabs 150a, 150b, 150c, 150d may proportionally adjust in response the first force by moving away from the channel 152 to a second position, thereby creating a larger opening to the channel 152. Moving away from the channel 152 may include, for example, one or more of the leg storage tabs 150b, 150d adjusting backwards away from the channel 152 and towards the first sidewall portion 120. Alternatively, or in addition, moving away from the channel 152 may include the leg storage tabs 150a, 150c rotating away from the channel 152 towards the rearward sidewall portion 110. In some instances, the movement of one or more of leg storage tabs 150a, 150b, 150c, 150d may be minimal. In some instances, for example, the movement of the one or more leg storage tabs 150a, 150b, 150c, 150d may not even be visible to the naked eye as the movement can merely include a small flex in the material such as plastic that is used to create the leg storage tabs 150a, 150b, 150c, 150d that is sufficient to enable a leg such as the leg 910 to travel into the channel 152. Once leg 910 travels into the channel 152, the force that was applied to the leg 910 is alleviated and one or more of the leg storage tabs 150a, 150b, 150c, 150d that moved in response to the force to allow the leg 910 to enter the channel 152 can adjust back to the first position.

In some implementations, each leg storage unit 150, 160 can include two channels such as leg channels 152, 154 for leg storage channel 150. In such implementations, each leg channel 152, 154 can include a set of one or more storage tabs. In some implementations, each leg channel can have four leg storage tabs that are arranged in the same alternating manner along their respective channel as leg storage tabs 150a, 150b, 150c, 150d. The other leg storage tabs of the other channels can function in the same manner as the leg storage tabs 150a, 150b, 150c, 150d.

Figure 2:
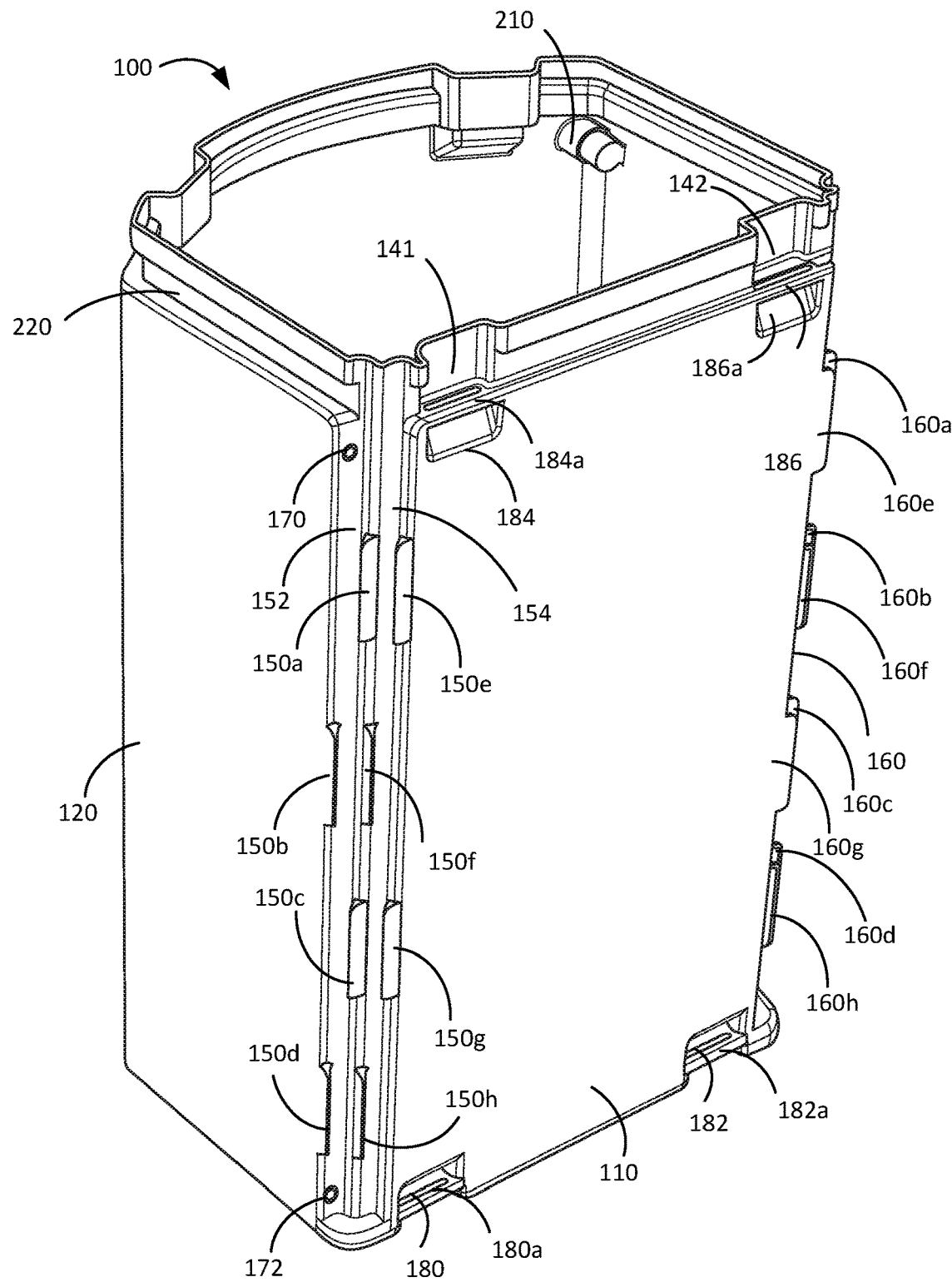
FIG. 2 is an illustration of a rearward perspective view of a first sidewall portion of an example of an uncapped multipurpose tool and storage device without legs stowed.

The first sidewall portion 120 and the second sidewall portion 130 (shown in FIG. 3) can extend from respective leg storage units 150 and 160, respectively, and merge together to create a curved frontward sidewall portion 190 as shown in FIG. 2. FIG. 2 is a rearward perspective view of a first sidewall portion 120 of an example of an uncapped multipurpose tool 100 and storage device without legs stowed. The first sidewall portion 120, the frontward sidewall portion 190, and the second sidewall portion 130, taken together, form a D-shaped shell for the multiple purpose utility tool 100. The D-shape of the container ensures that there are rounded edges that do not snag on a bag as the multipurpose tool is inserted into the bag.

The frontward sidewall portion 190 can include one or more coupling units 187a, 188a that are built into the frontward sidewall portion 190 using one or more recesses 187, 188. Each coupling unit 187a, 188a is configured to releasably engage an end of a strap (as shown in FIGS. 16 and 17). Each respective recess 187, 188 can be used to enable an end of a strap to access the coupling unit housed by the recess. In some implementations, a recess such as recess 187, 188 may be used to store at least a portion of a strap that has been coupled to a coupling unit 187a, 188a. This provides the benefit of allowing a person to couple straps to the multipurpose tool in a manner that enables the multipurpose tool 100 to be used as a back-pack without the ends of each respective strap digging into the person's back. This benefit is achieved because of the recesses 187, 188.

Figure 18:
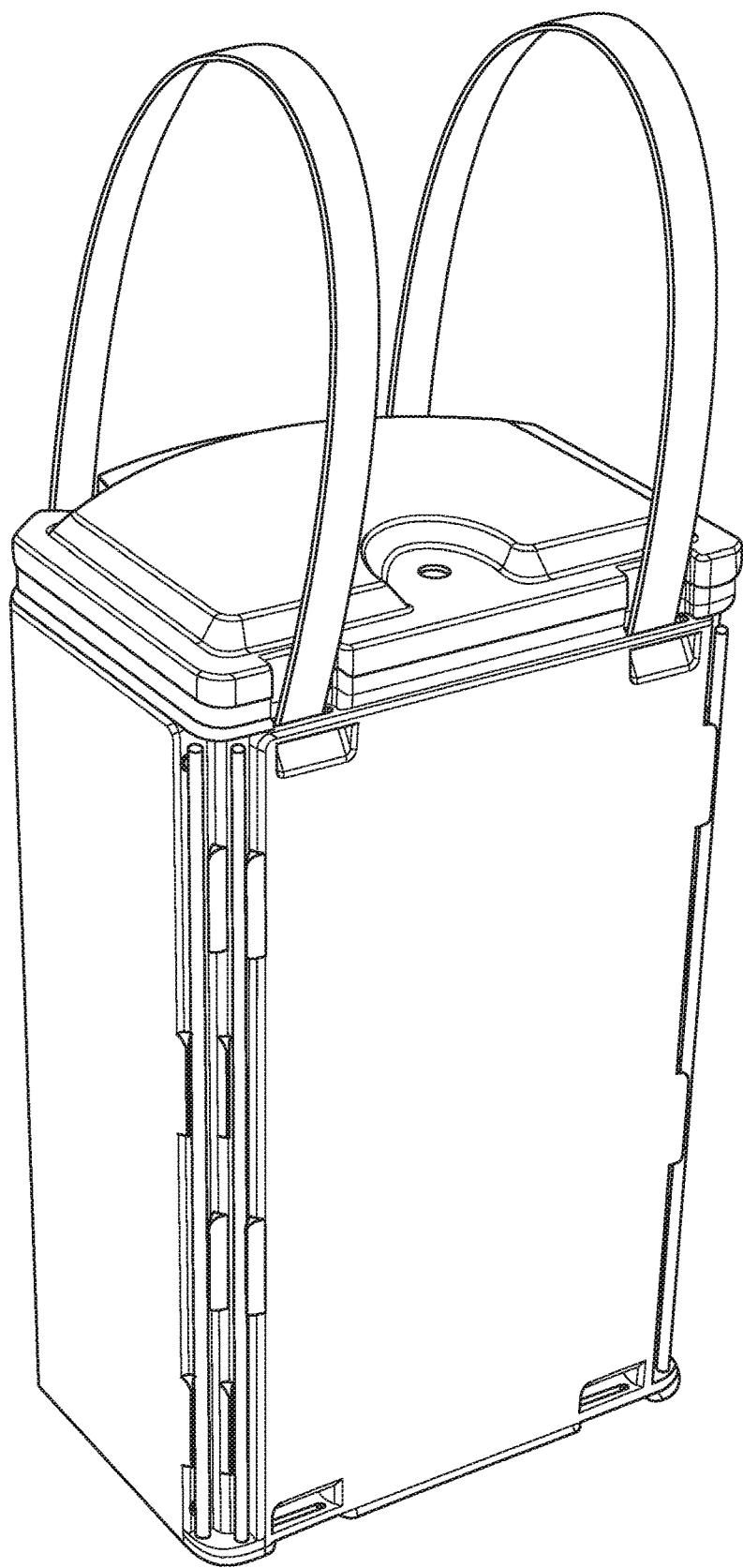
FIG. 18 is an illustration of a rearward perspective view of an example of a multipurpose tool and storage device that includes shoulder straps.

For coupling units 184a, 184a, 187a, 188a, the upper lip 220 (shown in FIG. 2) can be recessed to create respective grooves 141, 142, 143, 144 for receiving straps. These grooves 141, 142, 143, 144 provide a channel that receive straps for better control and comfort when straps are coupled to the coupling units as shown in FIG. 17 and FIG. 18.

Figure 5:
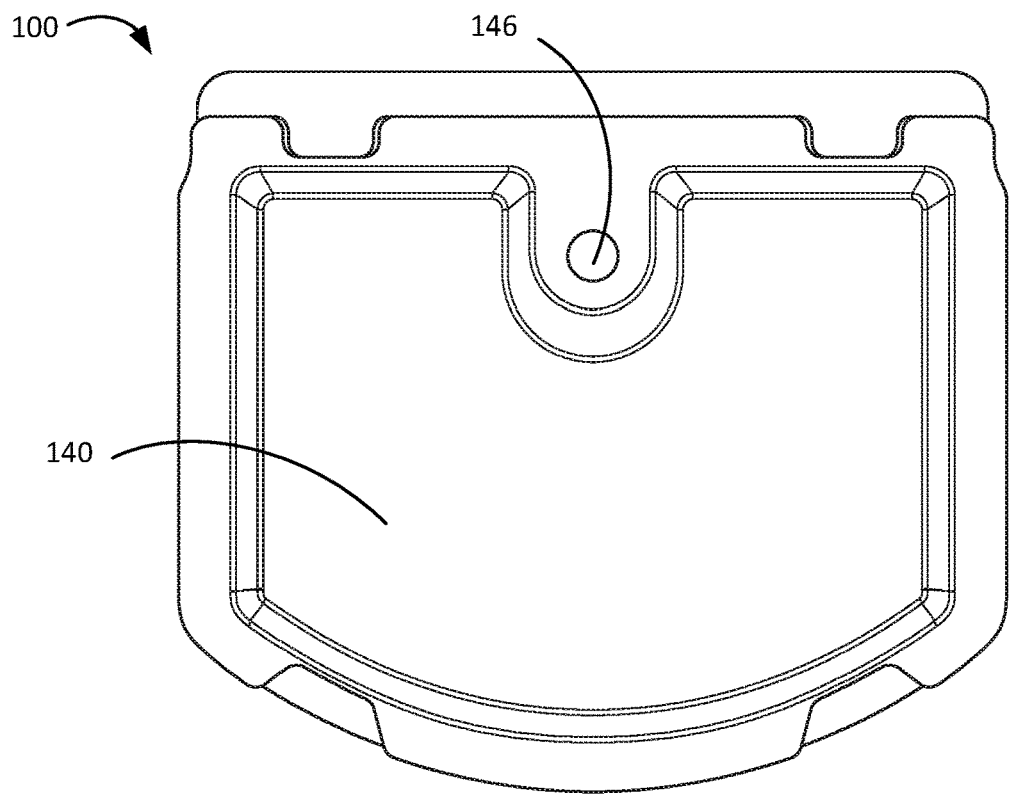
FIG. 5 is an illustration of a top view of an example of a multipurpose tool and storage device with a lid that caps the multipurpose tool and storage device.
Figure 6:
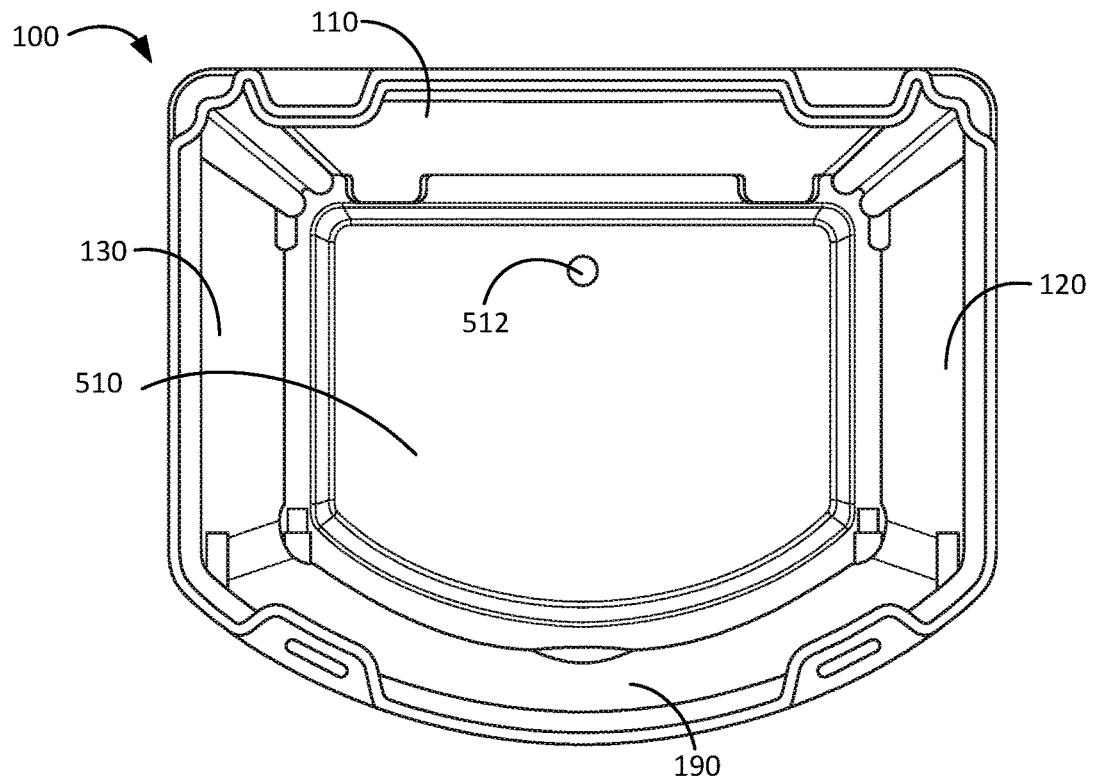
FIG. 6 is an illustration of a top view of an example of a multipurpose tool and storage device without a lid that caps the multipurpose tool and storage device.
Figure 7:
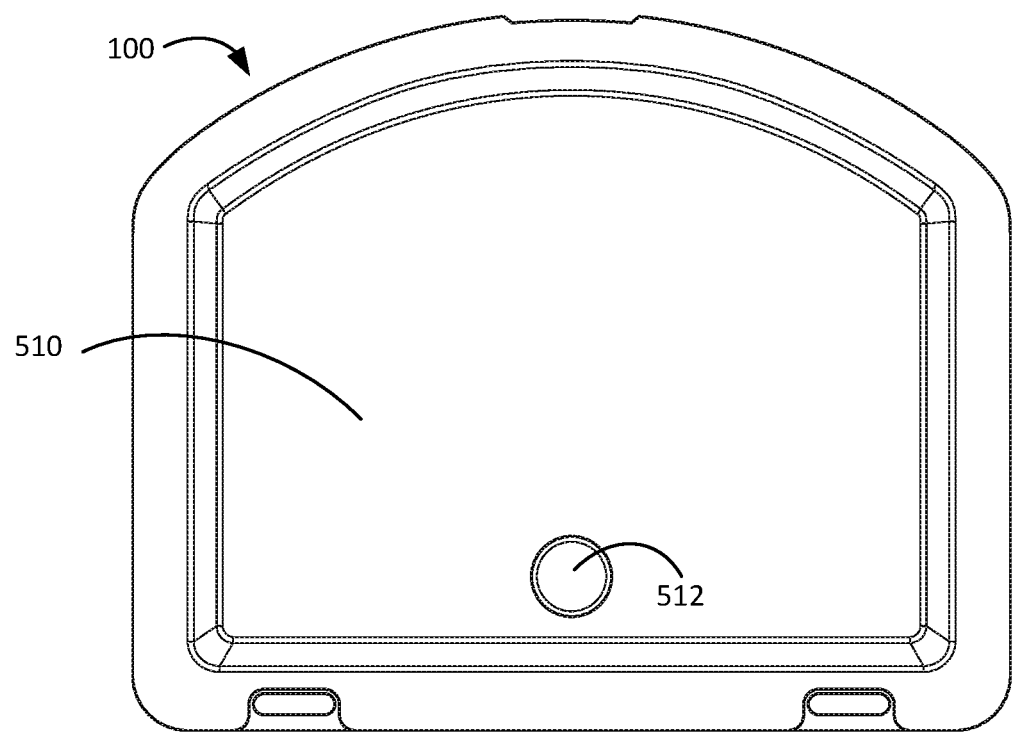
FIG. 7 is an illustration of a bottom view of an example of a multipurpose tool and storage device.
Figure 8:
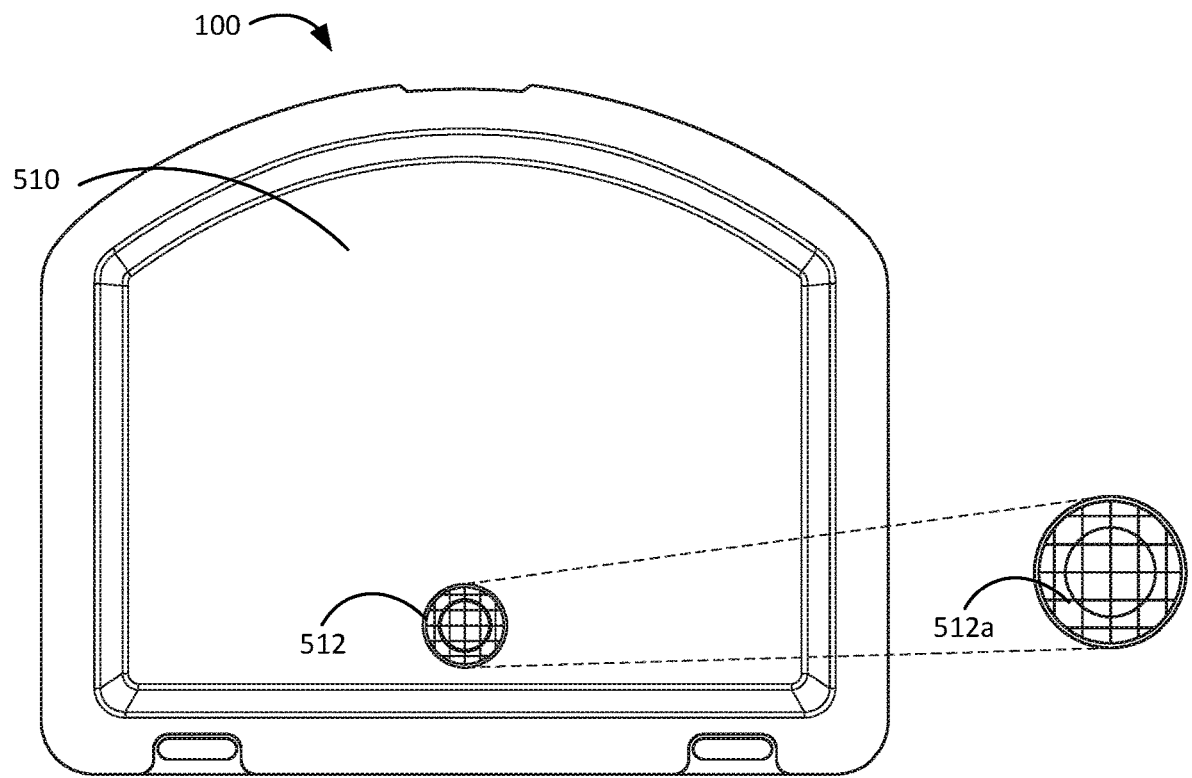
FIG. 8 is an illustration of a bottom view of an example of a multipurpose tool and storage device that depicts a strainer for filtering debris.

A lid 140 can be used to provide a covering to the open end of the multipurpose tool 100. FIGS. 1 and 5 show that the lid can include an opening 146 that can be used to access the multipurpose tool 100. In some implementations, the opening 146 in the lid 140 can be used to insert a water tube. The water tube can include a rubber hose that can be used to provide water into the storage area of the multipurpose tool 100. The lid 140 can have tapered edges so that the ends of the lid 140 can avoid snagging on a bag for those instances when the lid 140 is inserted in a bag. The lid 140 can also be configured to be stackable so that another multipurpose tool 100 can be stacked on top of the multipurpose tool 100. In some implementations, the multipurpose tool 100 can be configured to include an opening 512 in the bottom 510 of the multipurpose tool as shown in FIGS. 6 and 7. In such implementations, opening 512 of the multipurpose tool 100 can be positioned to align with the opening 146 of the lid 140 of another multipurpose tool in a manner that allows water to flow from the top multiple purpose tool to the bottom multipurpose tool through the openings 512, 146. In some implementations, a hose, gasket, water filter, or other device may be coupled to an upper opening 512 and a lower opening 146 to facilitate the transfer of water from the upper multipurpose tool to the lower multipurpose tool. The lower opening 512 of the multipurpose tool and the opening 146 can be plugged with a rubber plug, or other type of plug, when not in use.

In some implementations, the multipurpose tool 100 can be used as a fishing device, as a cleaning device, or even something else. In such implementations, the multipurpose tool 100 can be used to scoop water out of a water source such as a lake. Such an action may be done to catch a fish swimming in the water, gather water for cleaning an item, or some other reason. In such instances, dirty water may get into the multipurpose tool 100. In such instances, the water can be drained out the opening 512. A strainer filter 512a can be installed over the opening 512 to strain out debris that can be removed by hand. In other instances, strainer filter 512a may include a water filter that can be employed to filter water obtained from a water source using the multipurpose tool 100. In some implementations, the water may ready for drinking after passing through the filer 512a.

In some implementations, the multipurpose tool 100 can be used as a water storage device. In some implementations, the lid 140 and upper lip 220 can be configured to create a water tight seal. For example, a strip of rubber can be lined around the edges of the lid 140 such that, when the edges of the lid releasably engage the upper lip 200, a water tight seal is created. Other types of water tight seals can be used to prohibit water from escaping the multipurpose tool 100 when the lid is releasably engaged to the upper lip 200. Such use of a lid 140 that creates a water tight seal by releasably engaging the upper lip 200 can be particular advantageous when the multipurpose tool 100 is used in a table configuration as shown in FIG. 16. This is because the multipurpose tool 100 can be turned horizontally, while filled with water, without spilling the water contained in the storage compartment of the multipurpose tool 100.

The multipurpose utility tool 100 can include one or more leg coupling units 170, 172, 174, 176, 180, 182, 184, 186. The leg coupling units 170, 172, 174, 176 are each positioned at the outermost edges of the outermost leg storage channels, as shown in FIG. 1 (170, 172) and FIG. 14 (174, 176). The leg coupling unit 174, 176 are the same as the leg coupling units 170, 172. A leg such as leg 910, 920, 930, 940 can be coupled to a leg coupling unit in a variety of ways. For example, a leg such as leg 910 can have can be molded, machined, or the like to have a helical pattern and a leg coupling unit such as leg coupling unit 170 can be molded, machined, or the like to receive the helical patter. In such implementations, the leg such as leg 910 can be screwed into a leg coupling unit such as leg coupling unit 170 by twisting the leg in a first direction. In such implementations, the leg 910 can be unscrewed from the leg coupling unit 170 by unscrewing the leg 910 in the opposite directions. In other implementations, the leg coupling unit 170 may merely be a recess that is configured to receive a leg 910. In such implementations, a leg 910 can be input into the leg coupling unit 170 or removed from the leg coupling unit 170 without twisting the leg 910.

The leg coupling units 180, 182, 184, 186 are the same as the leg coupling unit 170. However, the leg coupling units 180, 182, 184, 186 are positioned on curved portion of the sidewalls of the multipurpose tool 100 that reside between the sidewall portions 120, 130, respectively, and the frontward sidewall portion 190. The location of these leg coupling units 180, 182, 184, 186 on these curved portion of the sidewalls of the multipurpose tool 100 creates an angle of stability θ between the legs and a plane 1610 that cuts through the frontward sidewall portion 190 as shown in FIG. 16. This angle of stability θ is greater than 90 degrees between the plane 1610 and the legs. This angle of stability θ is a direct result of the placement of the leg coupling units 170 on the curved portion of the sidewalls of the multipurpose tool. These curved walls provide advantages when inserting the multipurpose tool 100 into a bag.

An example of leg storage compartments and leg coupling units have been described, at length, above. However, the present disclosure need not be so limited. Instead, implementations of the present disclosure can include one or more legs that are rotatably coupled to one or more portions of the multipurpose tool 100. Such legs may be attached to the multipurpose tool 100 using a hinged mechanism that allows each leg to rotate from a leg storage compartment to a deployed position and then rotate back from the deployed position to a leg storage compartment. In such an implementation, the legs that are rotatably coupled to respective leg coupling units may, or may not be, removable.

Figure 25A:
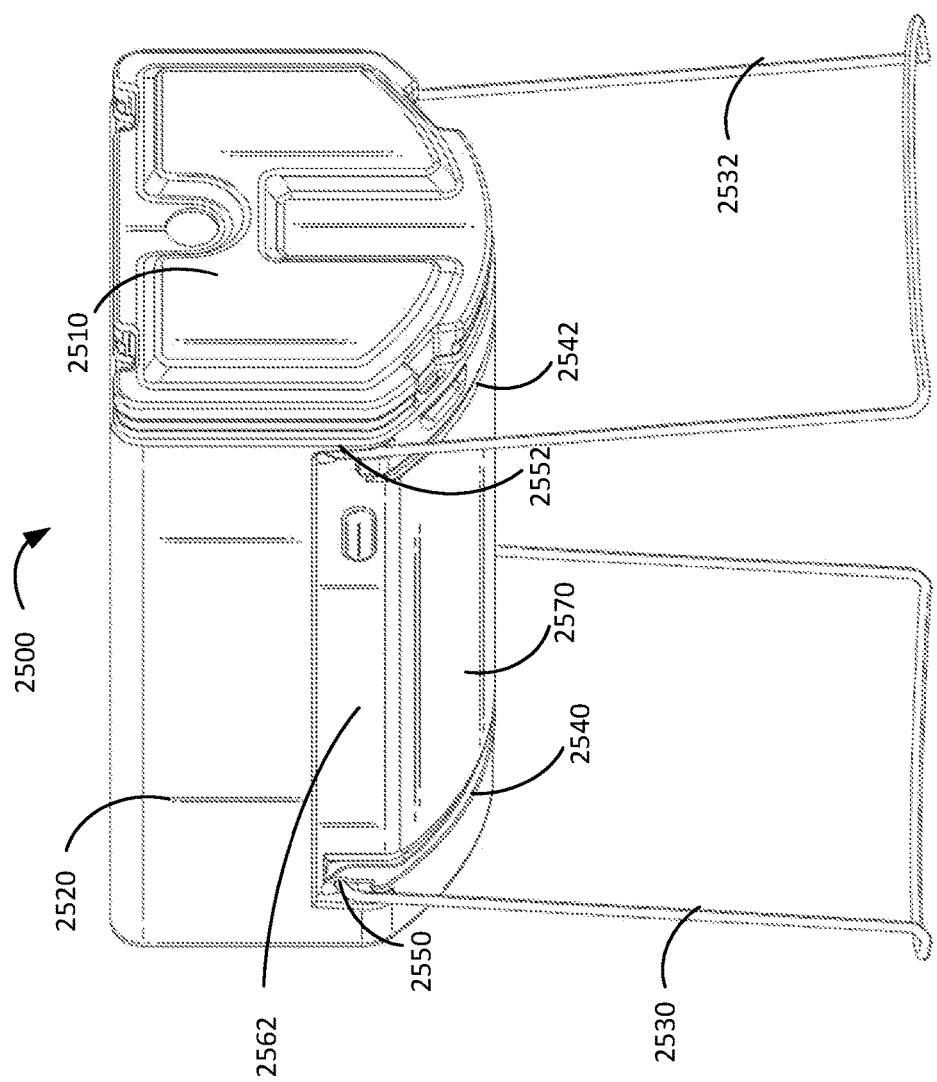
FIG. 25A is an illustration of a horizontal perspective view of a multipurpose tool that includes deployed legs coupled to the multipurpose tool using a hinged mechanism.

An example of a multipurpose tool 2500 using a hinged mechanism is depicted in FIGS. 25A-25E. In FIG. 25A, the multipurpose tool 2500 shares many characteristics of other implementations of the multipurpose tool described herein. For example, the multipurpose tool 2500, as shown in FIG. 25A, is D-shaped and includes a first sidewall portion 2520, a frontward sidewall portion 2570, and a lid 2510. The multipurpose tool 2500 can also include a rearward sidewall portion, second sidewall portion, and bottom, which are not shown in FIG. 25A, but can correspond to other second sidewall portions, rearward sidewall portions, and bottoms described herein.

Figure 24:
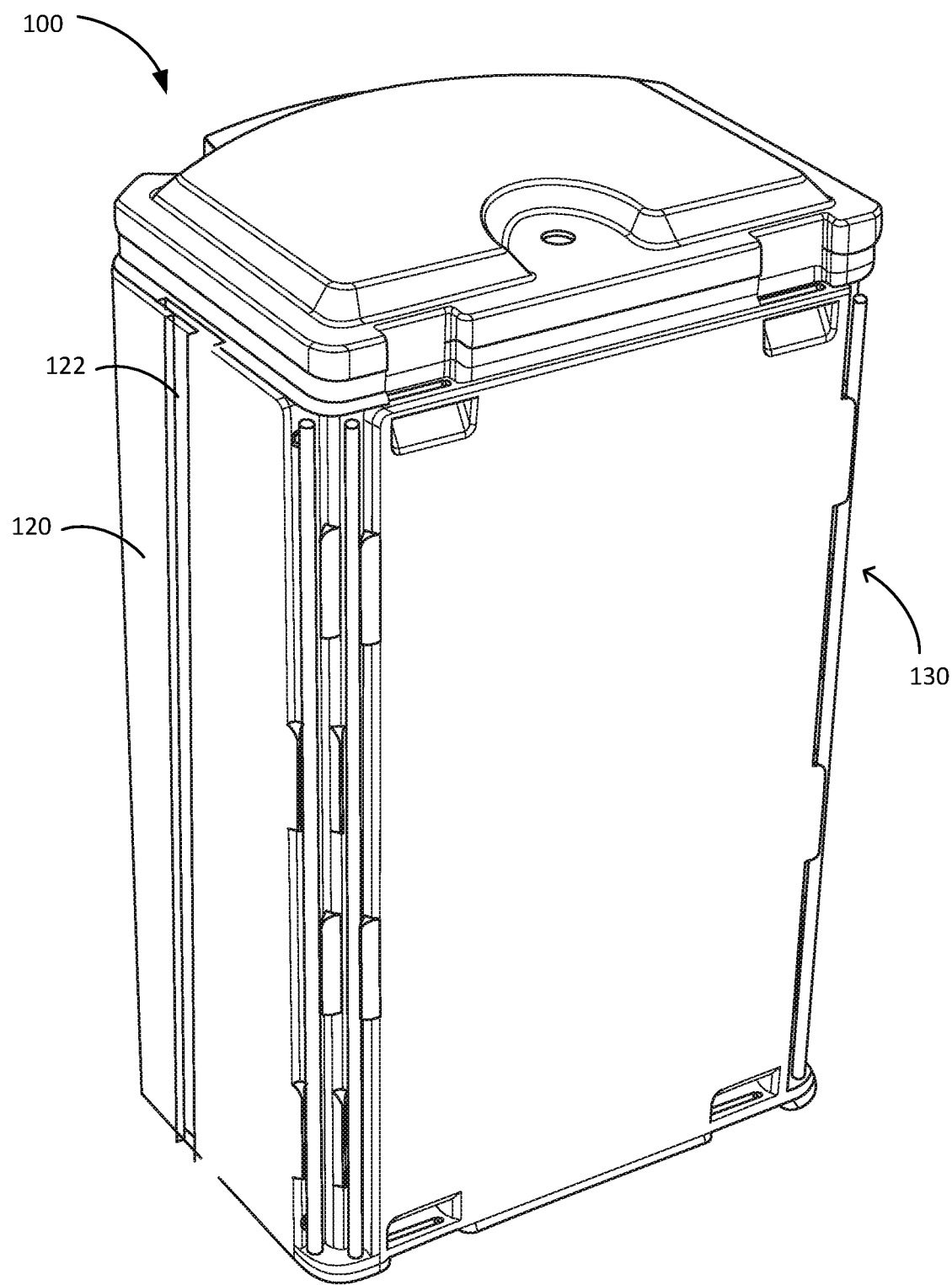
FIG. 24 is an illustration of a rearward perspective view of a first sidewall portion of an example of a multipurpose tool and storage device with legs stowed that includes a channel for mating with skids of a bag.
Figure 25B:
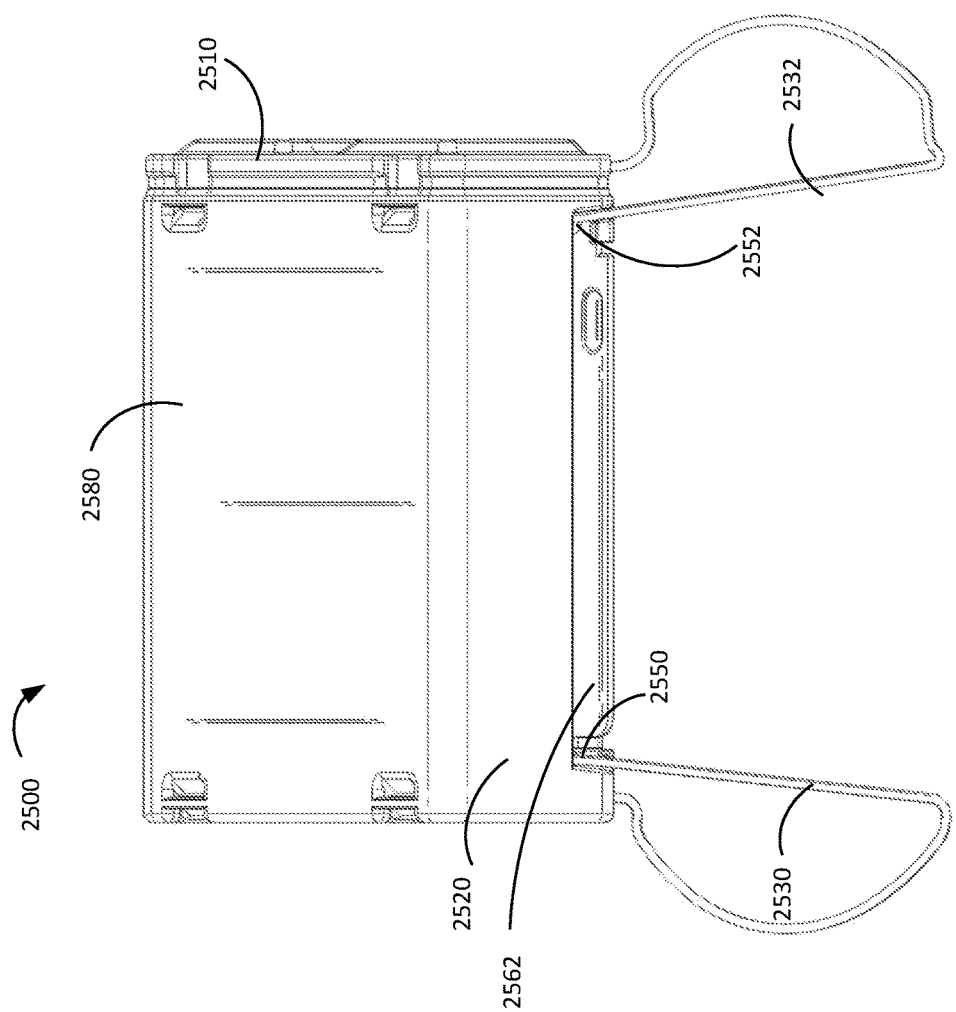
FIG. 25B is an illustration of a horizontal view of a multipurpose tool that includes deployed legs coupled to the multiple purpose tool using a hinged mechanism.
Figure 25C:
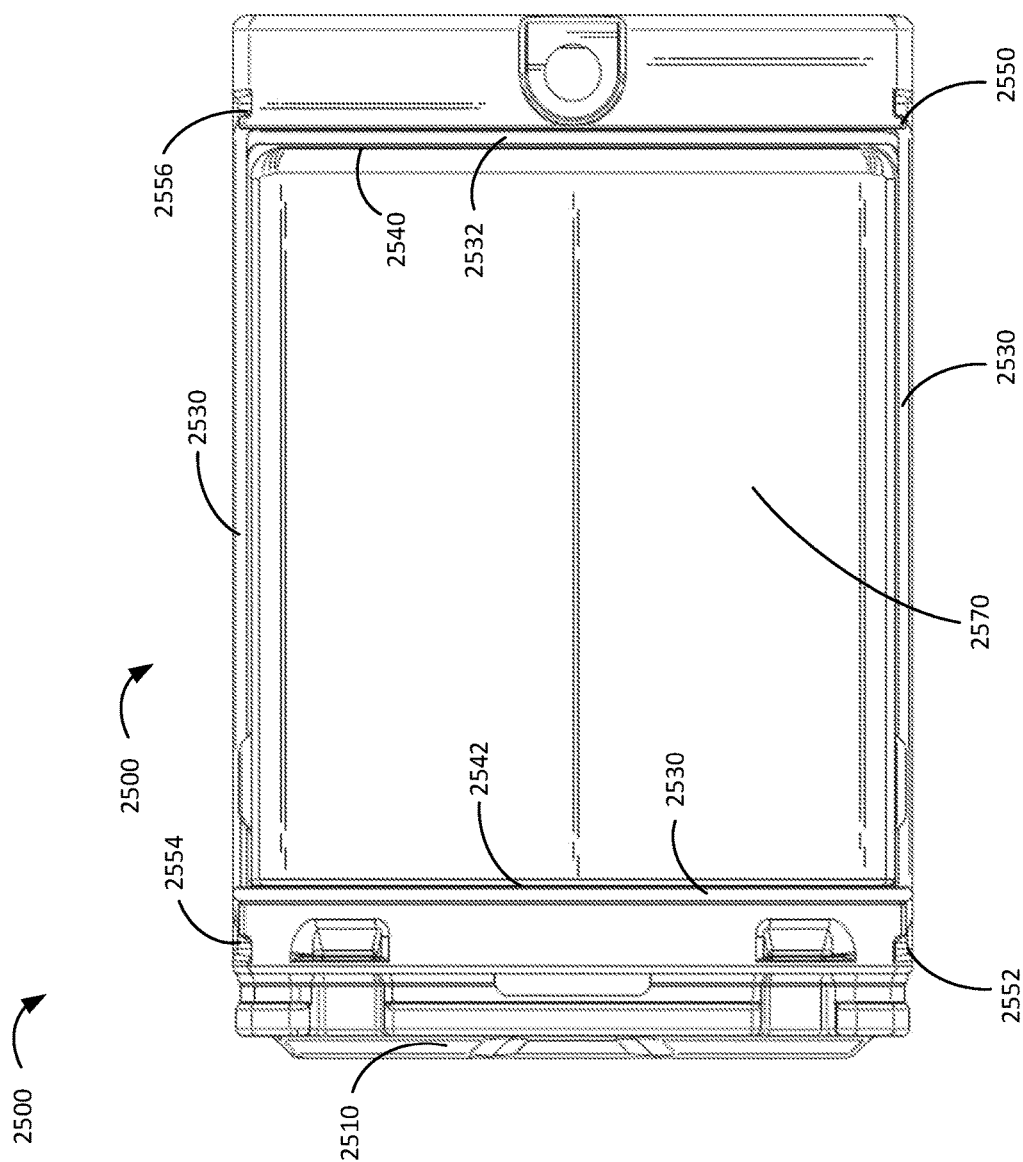
FIG. 25C is an illustration of a forward sidewall portion of a multipurpose tool that includes stowed legs coupled to the multipurpose tool using a hinged mechanism.

The multipurpose tool 2500 is different than other implementations in that the legs 2530, 2532 are coupled to the multipurpose tool 2500 using a hinge mechanism 2550, 2552 that enables the legs 2530, 2532 to rotate from a storage position (e.g., as shown in FIGS. 25C and 24D) to a standing position (e.g., as shown in FIGS. 25A and 25B). The hinge mechanism 2550, 2552 can be any hinge mechanism that enables the legs 2530, 2532 to rotatably adjust from the storage position to the standing position. This configuration of multipurpose tool 2500 contrasts with other embodiments herein which requires legs to be removably coupled to the multipurpose tool.

Certain implementations of the multipurpose tool 2500 can provide advantages over multipurpose tools described herein such as a guarantee that the legs 2530, 2532 remain coupled to the multipurpose tool 2500. This is in contrast to other embodiments described herein whose legs, regardless of whether they be hinged or not hinged, are removably coupled to the multipurpose tool. Moreover, rotatably coupled legs 2530, 2532 provide other advantages such as quick set up and take down of the legs 2530, 2532 of the multipurpose 2500 in contrast to other implementations which may require legs to be screwed into the multipurpose body 2500 one leg at a time.

Figure 25D:
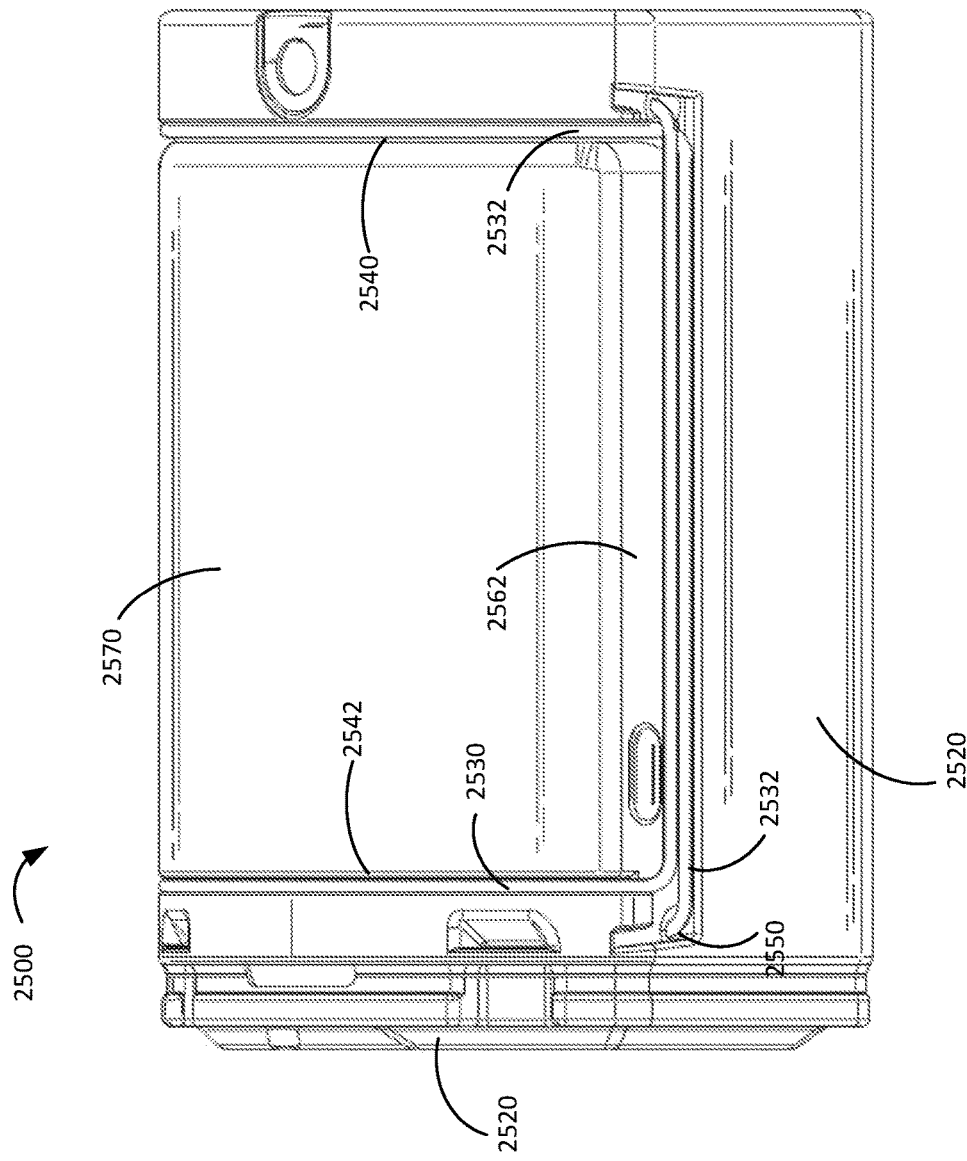
FIG. 25D is an illustration of a vertical perspective view of a multipurpose tool having stowed legs coupled to the multipurpose tool using a hinged mechanism.

The multipurpose tool 2500 can include leg storage units 2540, 2542. In some implementations, these leg storage units 2540, 2542 can include recessed channels that are each configured to receive a respective leg 2530, 2532. For example, the leg storage unit 2540 can be configured to receive the leg 2532 when the leg 2532 is rotated from its standing position in FIG. 25A to a storage position (e.g., as shown in FIGS. 25C and 25D). By way of another example, the leg storage unit 2542 is configured to receive the leg 2530 when the leg 2530 is rotated from its sanding position in FIG. 25A to a storage position (e.g., as shown in FIGS. 25C and 25D). In implementations, a portion 2562 of the first sidewall portion 2520 can also be recessed to accommodate receipt and storage of the legs 2530, 2532. A similarity portion of the second sidewall portion can also be recessed the same manner. Another view of the multipurpose tool 2500 in a standing position is shown in FIG. 25B. In 25B, the rearward sidewall portion 2580 is also displayed.

Figure 25E:
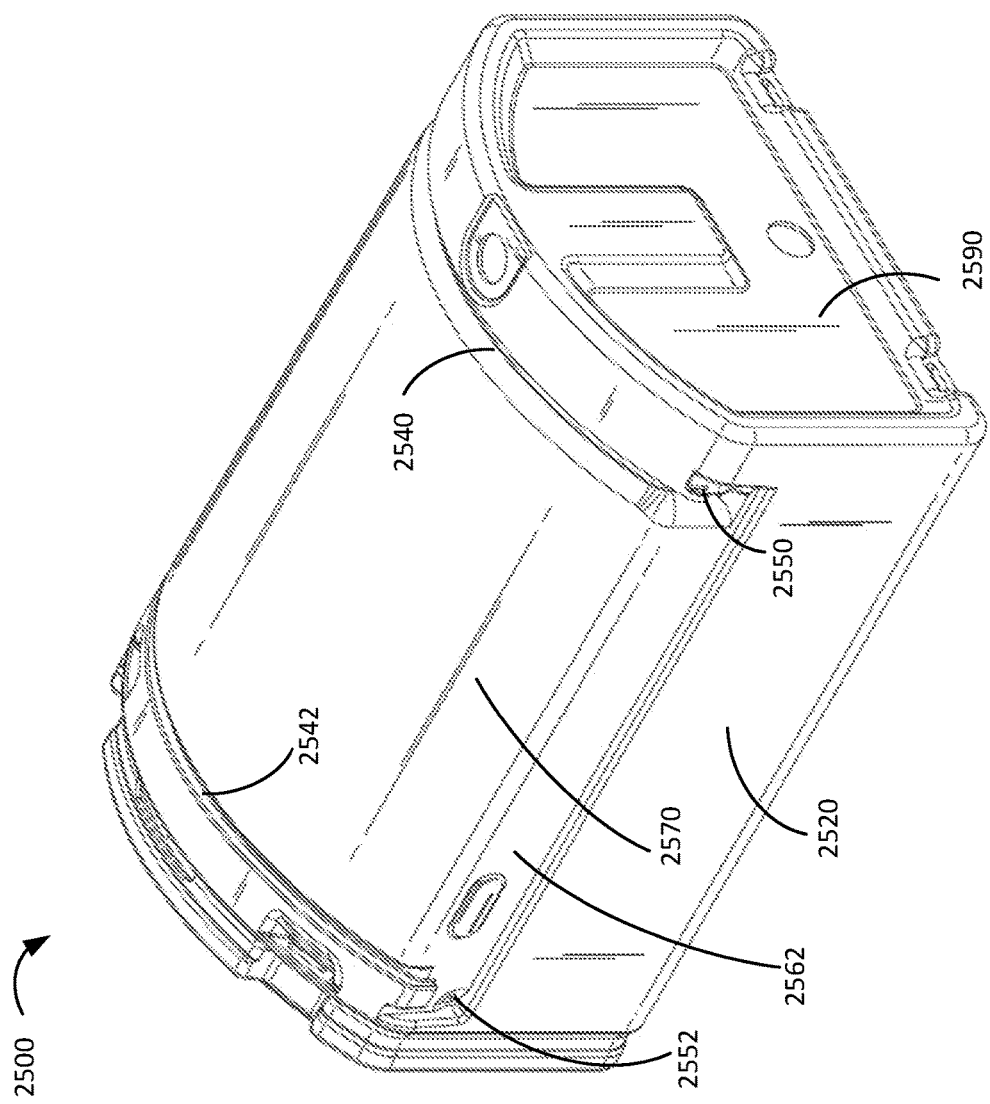
FIG. 25E is an illustration of a horizontal perspective view of a multipurpose tool having stowed legs coupled to the multiple purpose tools using a hinged mechanism.

FIGS. 25C and 25D illustrate an example of the multipurpose tool 2500 with legs 2530 and 2532 collapsed into their respective leg storage units 2540, 2542. FIG. 25E is an example of the multipurpose tool 2500 with legs 2530, 2532 removed, thereby depicting the recessed channels of the leg storage units 2540, 2542. Accordingly, in some implementations, the legs 2530, 2532 may be removable, whereas in other implementations, the legs 2530, 2532 may be non-removable.

Figure 9:
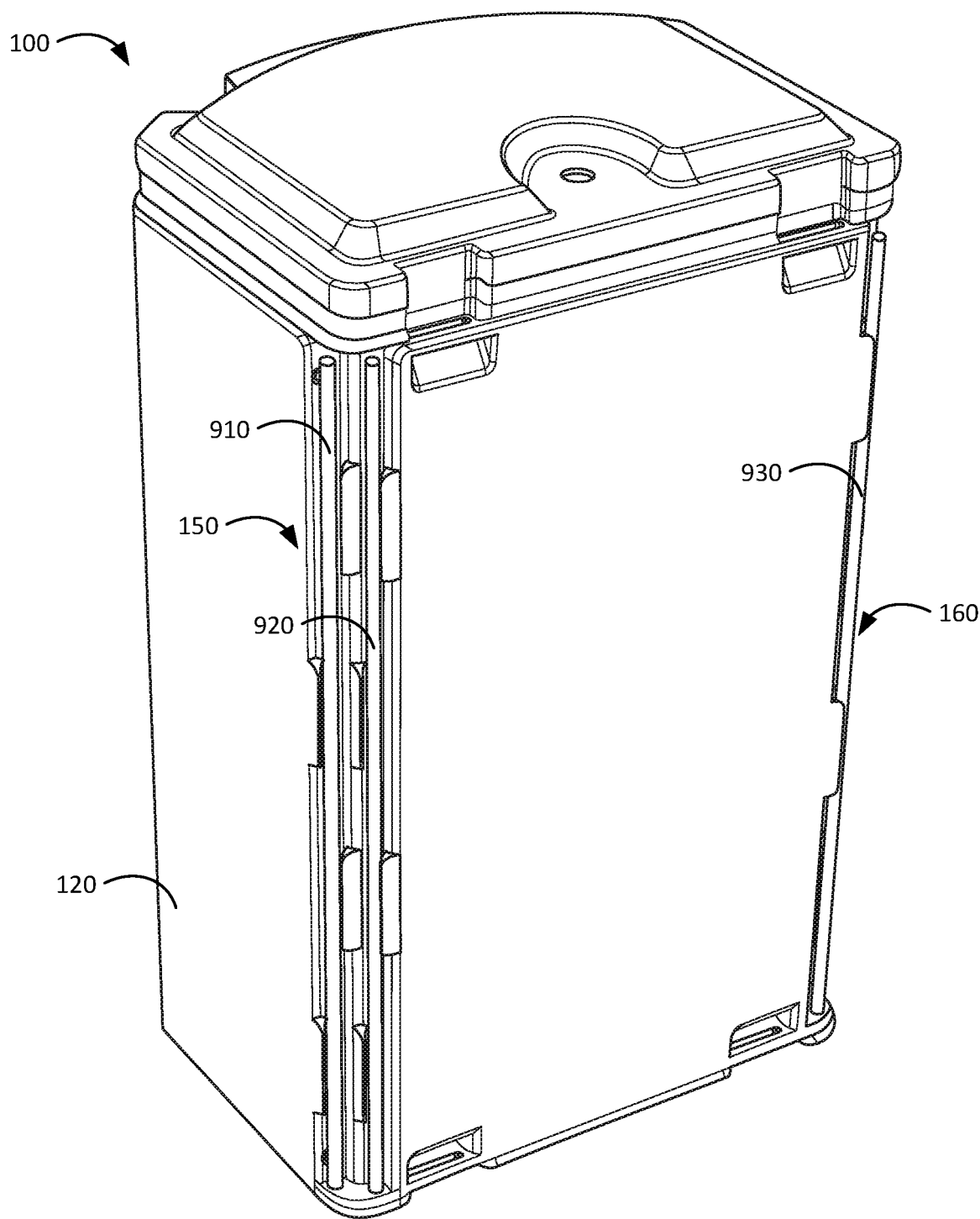
FIG. 9 is an illustration of a rearward perspective view of a first sidewall portion of an example of a multipurpose tool and storage device with legs stowed.
Figure 10:
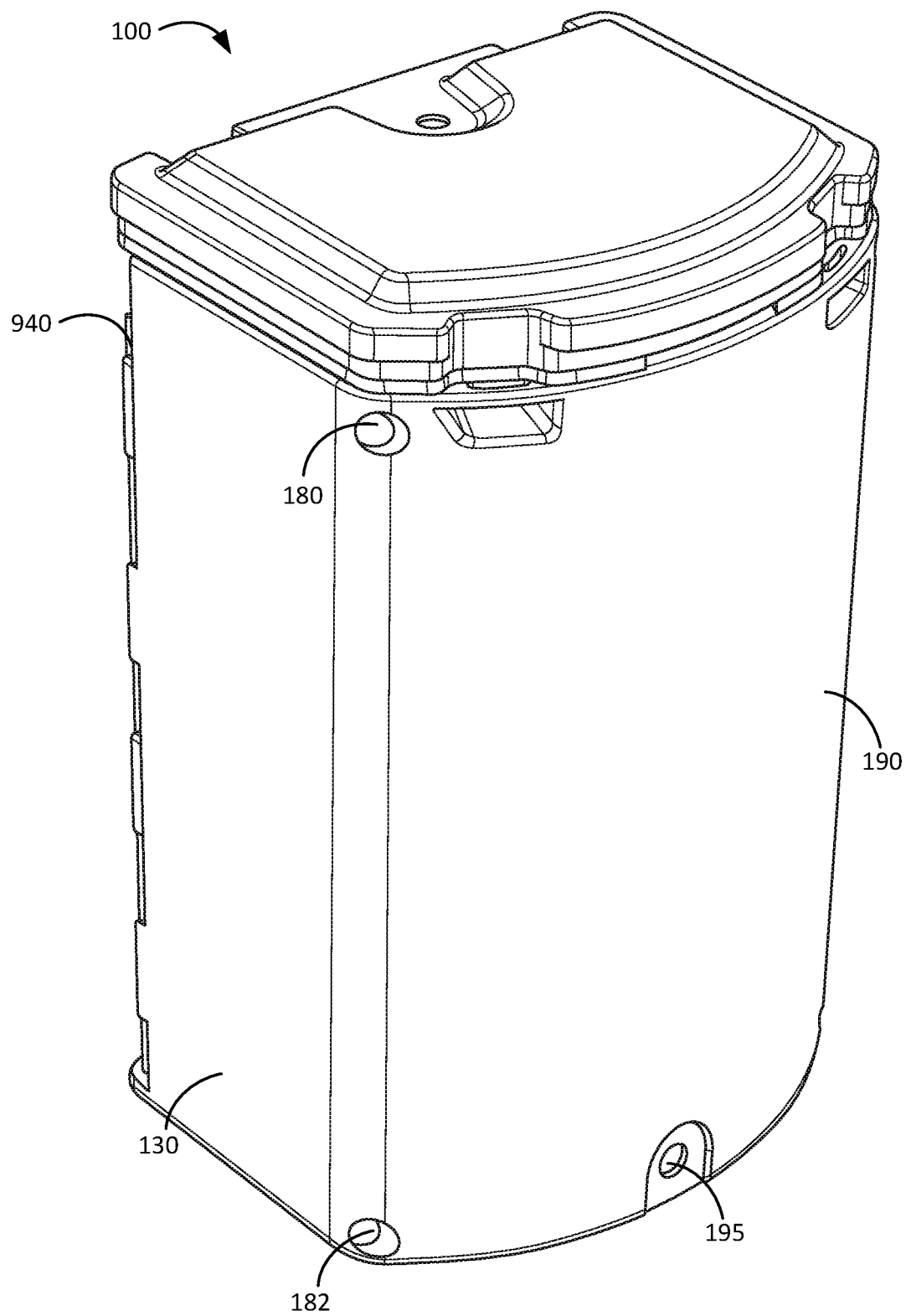
FIG. 10 is an illustration of a frontward perspective view of a second sidewall portion of an example of a multipurpose tool and storage device.
Figure 11:
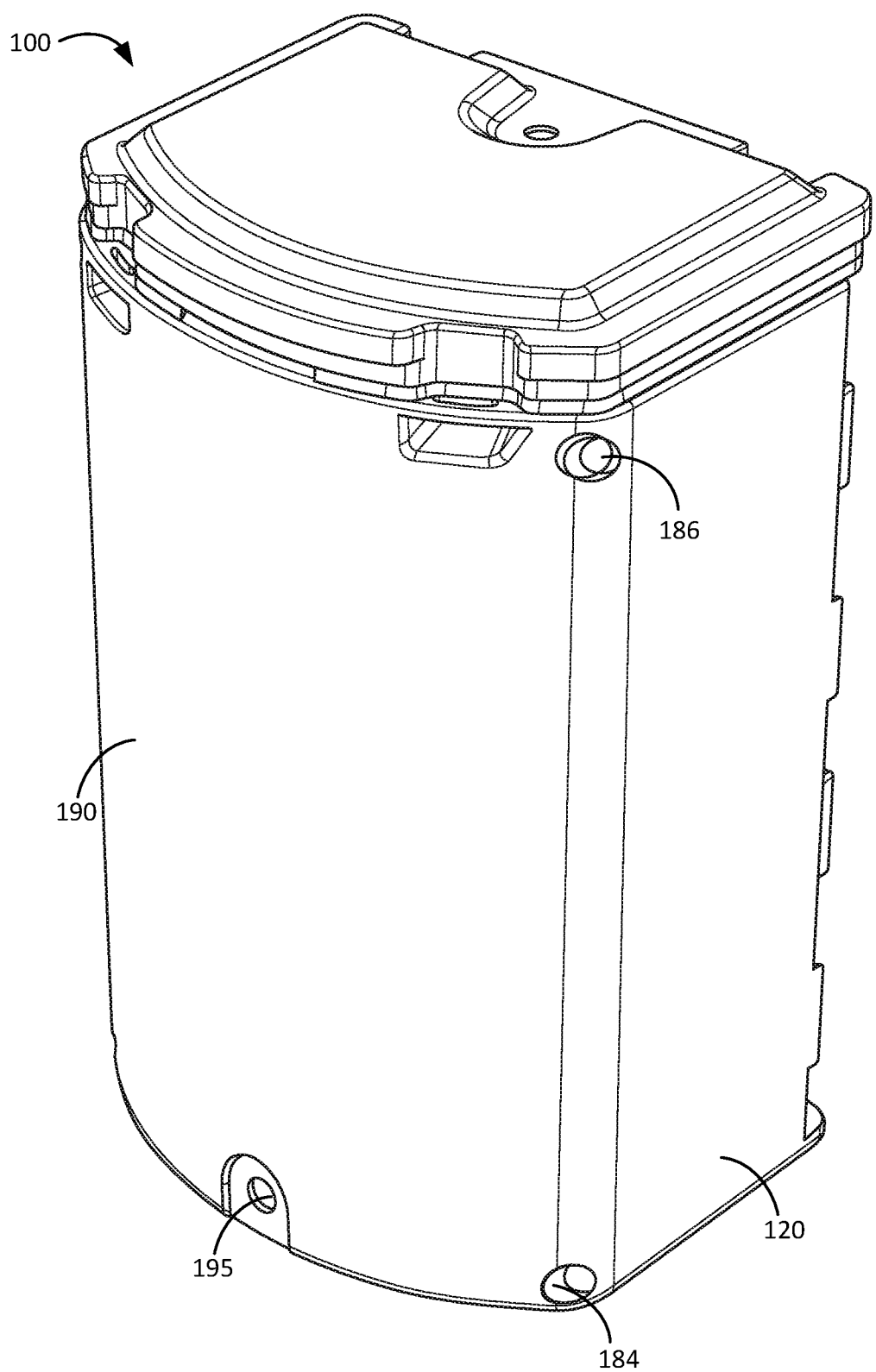
FIG. 11 is an illustration of a frontward perspective view of a first sidewall portion of an example of a capped multipurpose tool and storage device.
Figure 12:
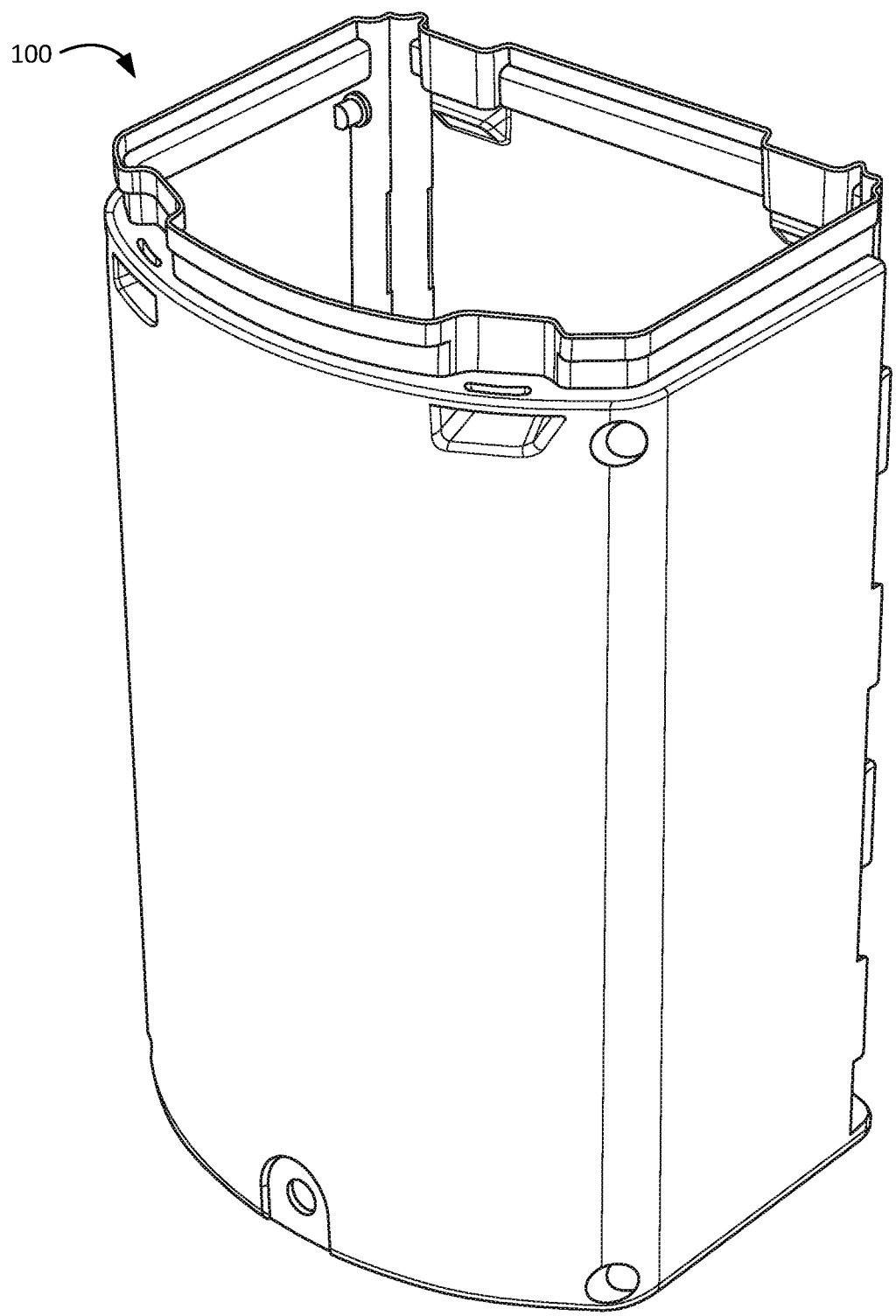
FIG. 12 is an illustration of a horizontal-perspective view of a first sidewall portion of an example of an uncapped multipurpose tool and storage device with legs installed.

FIG. 9 is a rearward perspective view of a first sidewall portion 120 of an example of a multipurpose tool 100 and storage device with legs stowed. For example, this view shows legs 910, 920, and 930 housed within respective channels 152, 154, 162 of the leg storage units 150, 160. The legs 910, 920, 930 are releasably secured in the channel using the one or more leg storage tabs. Leg 940 (shown in FIG. 10) is similarly held in place by a channel 164 of the leg storage unit 160 using one or more leg storage tabs. However, leg 940 is not shown in FIG. 9.

Figure 13:
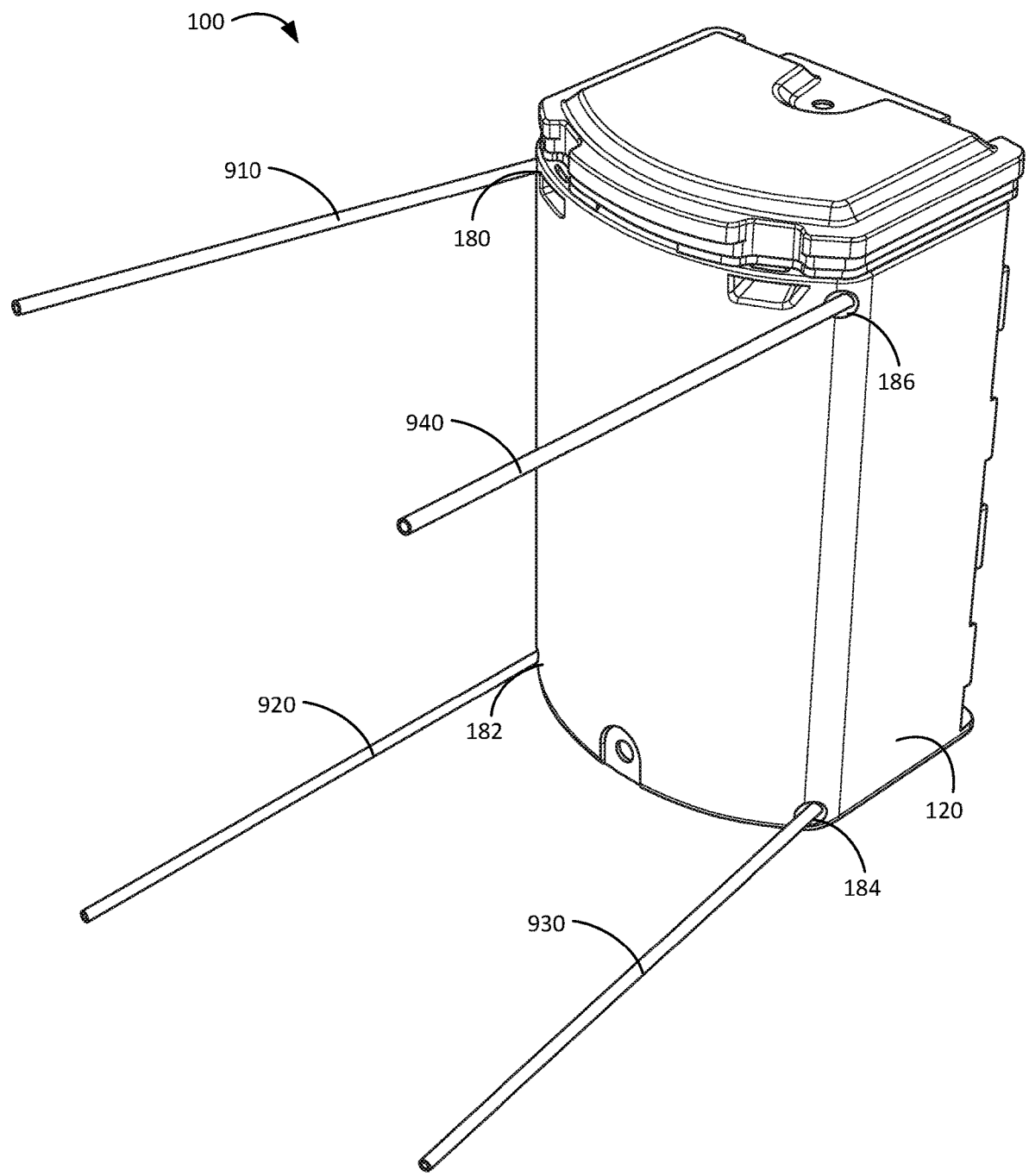
FIG. 13 is an illustration of a frontward perspective view of a first sidewall portion of an example of a multipurpose tool and storage device with legs installed.
Figure 14:
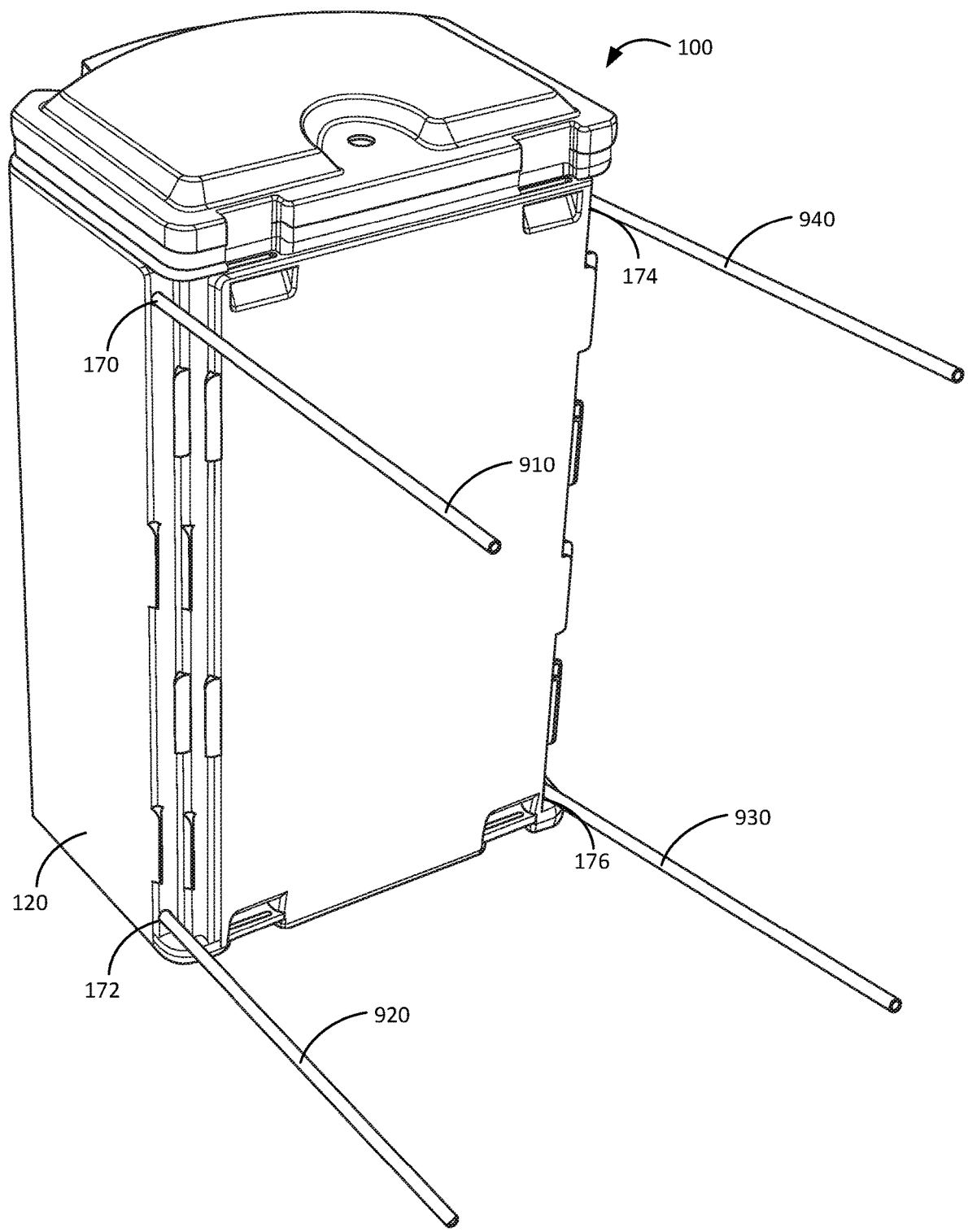
FIG. 14 is an illustration of a rearward view of an example of a capped multipurpose tool and storage device with legs installed.
Figure 15:
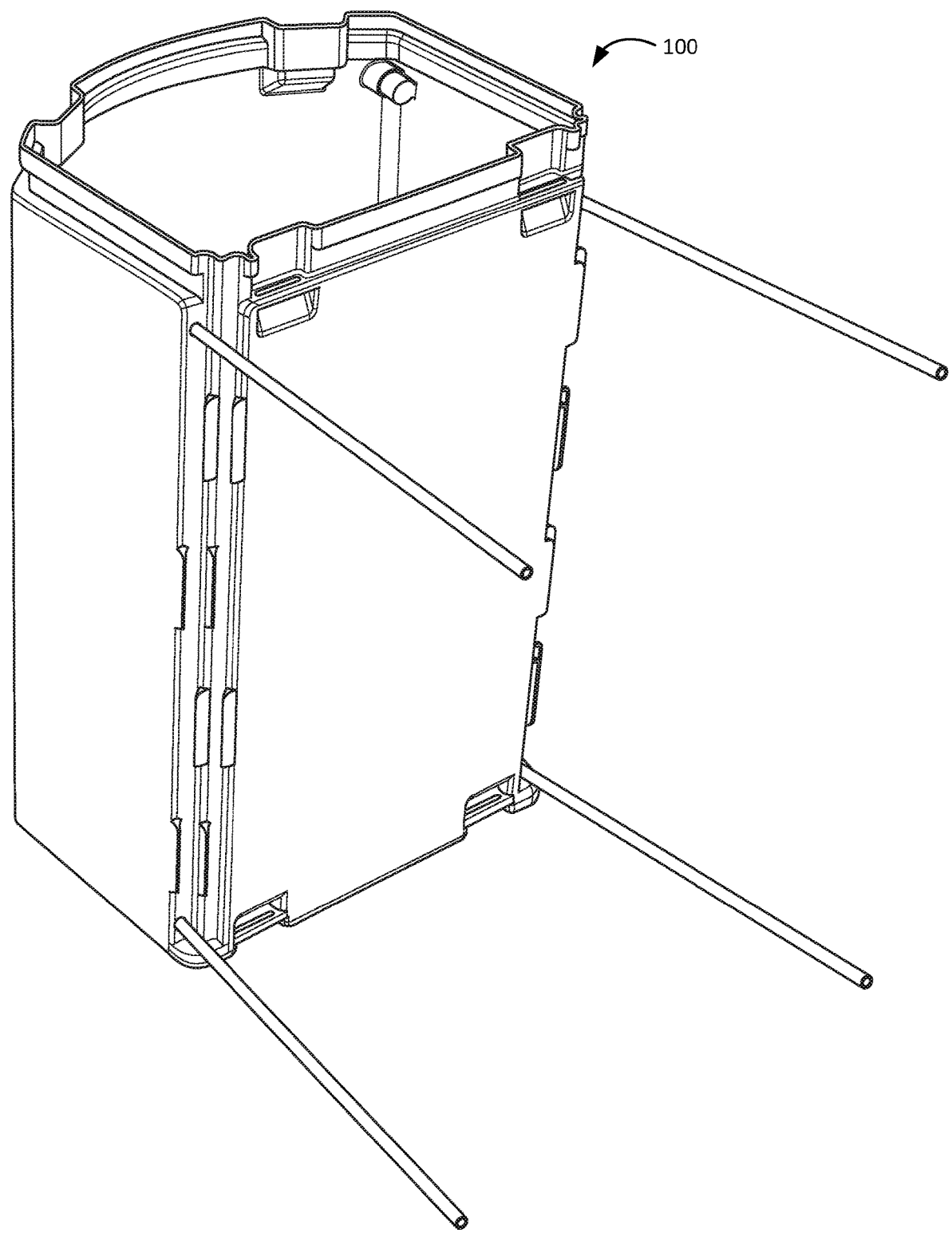
FIG. 15 is an illustration of a rearward perspective view of an example of an uncapped multipurpose tool and storage device that includes hand straps.

FIG. 13 is a frontward perspective view of a first sidewall portion of an example of a multipurpose tool 100 and storage device with legs 910, 920, 930, 940 coupled with leg coupling units 180, 182, 184, 186 respectively. FIG. 14 is a rearward perspective view of a second sidewall portion of a multipurpose tool and storage device with legs 910, 920, 930, 940 coupled with leg coupling units 170, 172, 174, 176, respectively.

Figure 19:
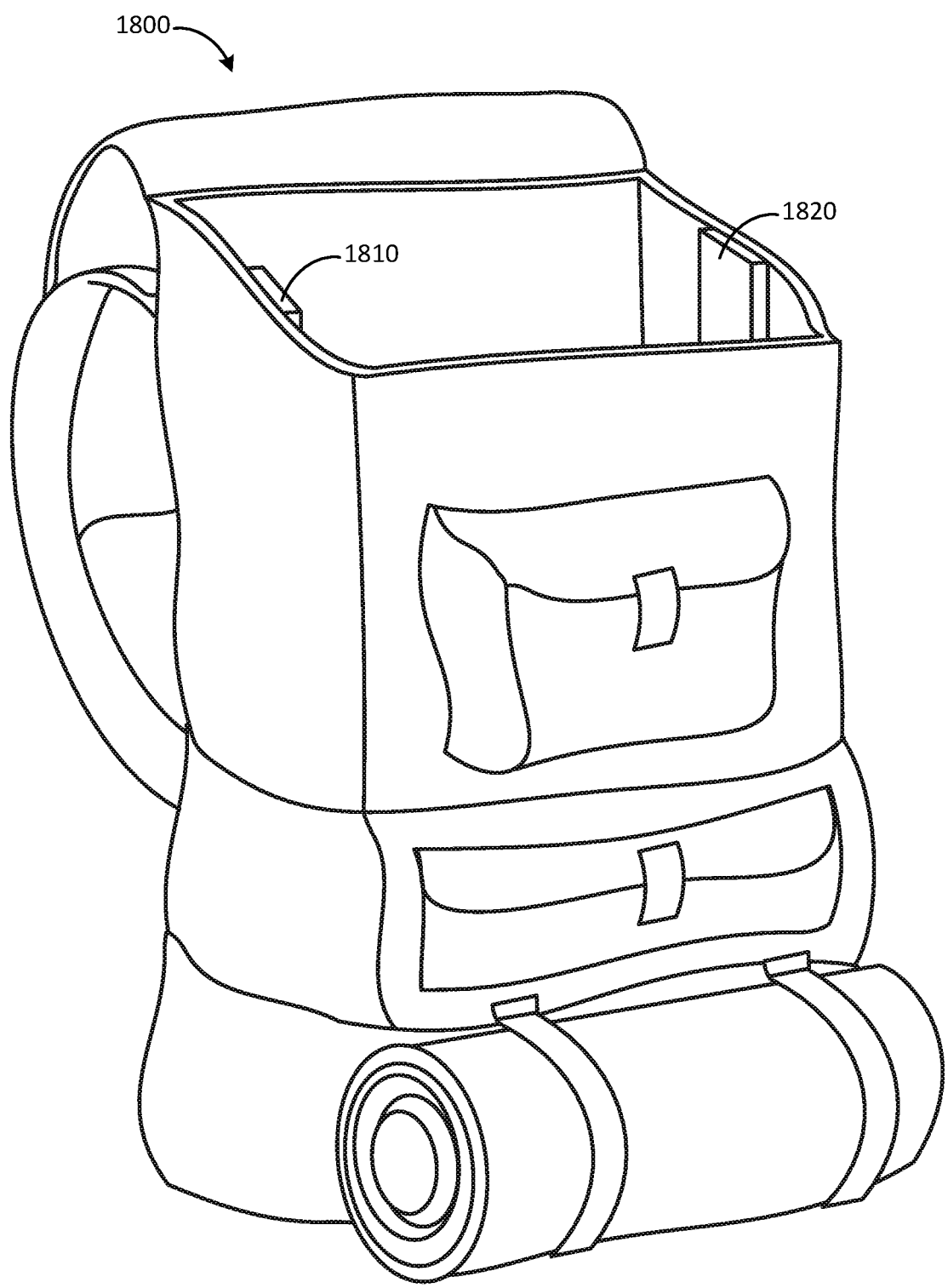
FIG. 19 is an illustration of a frontward perspective view of an example of a bag that has been configured with skids to facilitate stowing a multipurpose tool and storage device within the bag.
Figure 20:
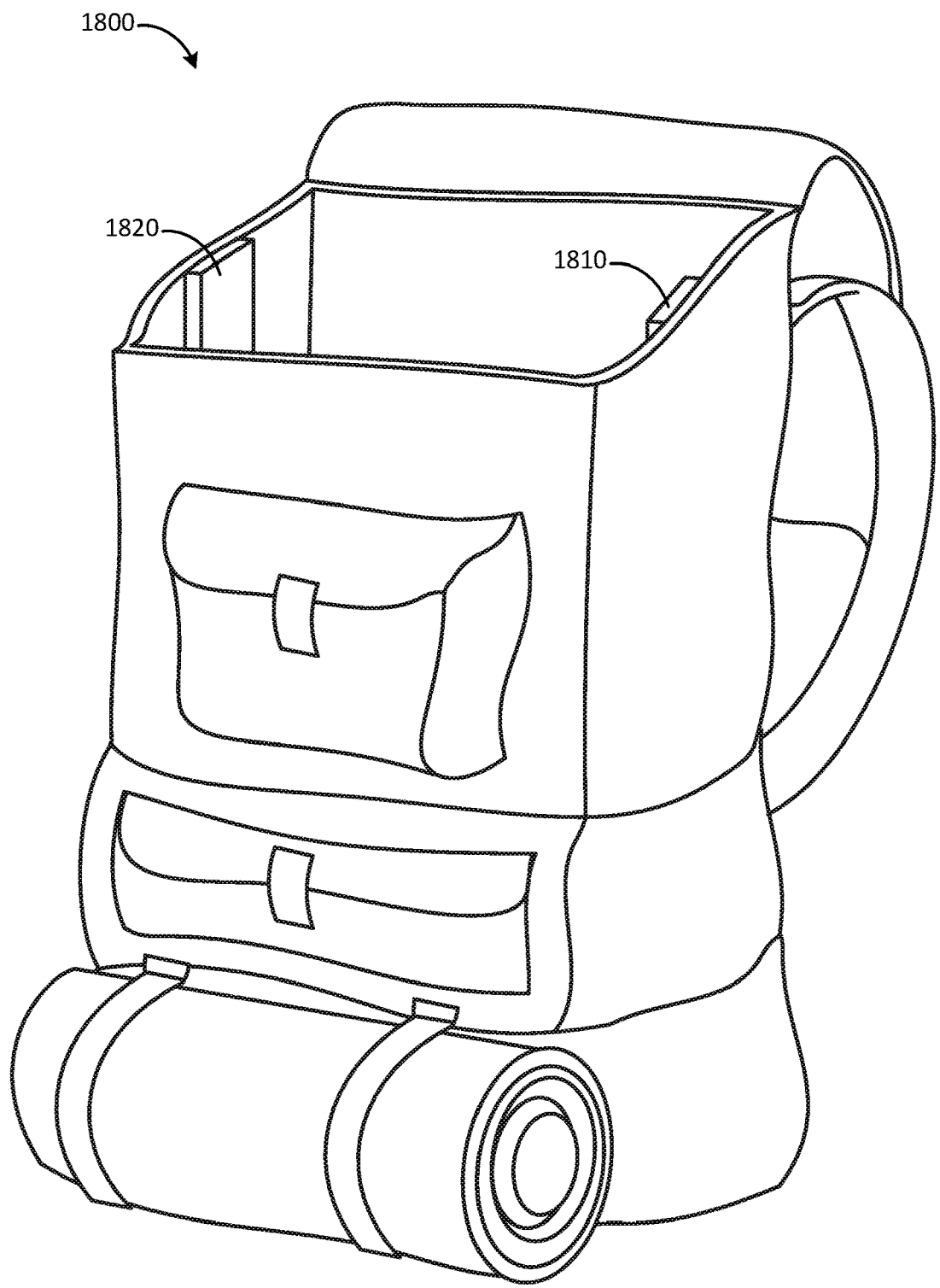
FIG. 20 is an illustration of another frontward perspective view of an example of a bag that has been configured with skids to facilitate stowing of a multipurpose tool and storage device within the bag.

FIG. 19 is a frontward perspective view of an example of a bag 1800 that has been configured with skids 1810, 1820 to facilitate stowing a multipurpose tool 100 and storage device within the bag 1800. In this example, bag 1800 skids 1810, 1820 are configured to guide the multipurpose tool 100 into, or out of, the bag 1800. The skids may be made of a material such as plastic and function to reduce friction that occurs when sliding the multipurpose tool 100 into the bag and reduce snags. FIG. 20 is another frontward perspective view an example of a bag 1800 that has been configured with skids 1810, 1820 to facilitate stowing multipurpose tool 100 and storage device in the bag 1800. In some implementations, the skids 1810, 1820 may generally be flat plastic strips used to line inside walls of the bag 1800, as shown in FIGS. 19 and 20. However, in other implementations, the skids 1810, 1820 can be other shapes such as triangular plastic strips, T-shaped plastic strips, or the like.

Figure 21:
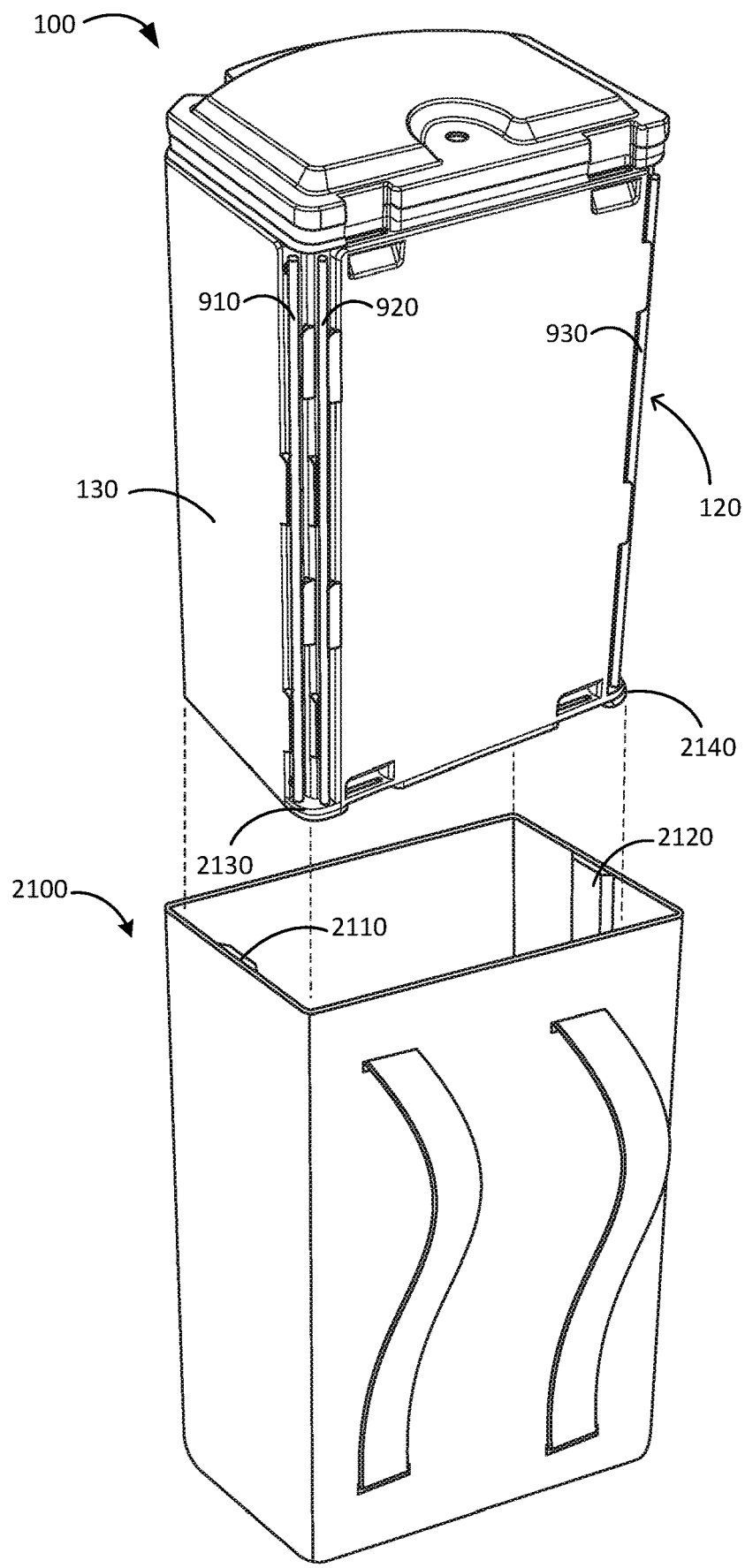
FIG. 21 is an illustration of a rearward perspective view that shows an example of a multipurpose tool and storage device being inserted into a bag that has been configured with skids to stow the multipurpose tool and storage device.
Figure 22:
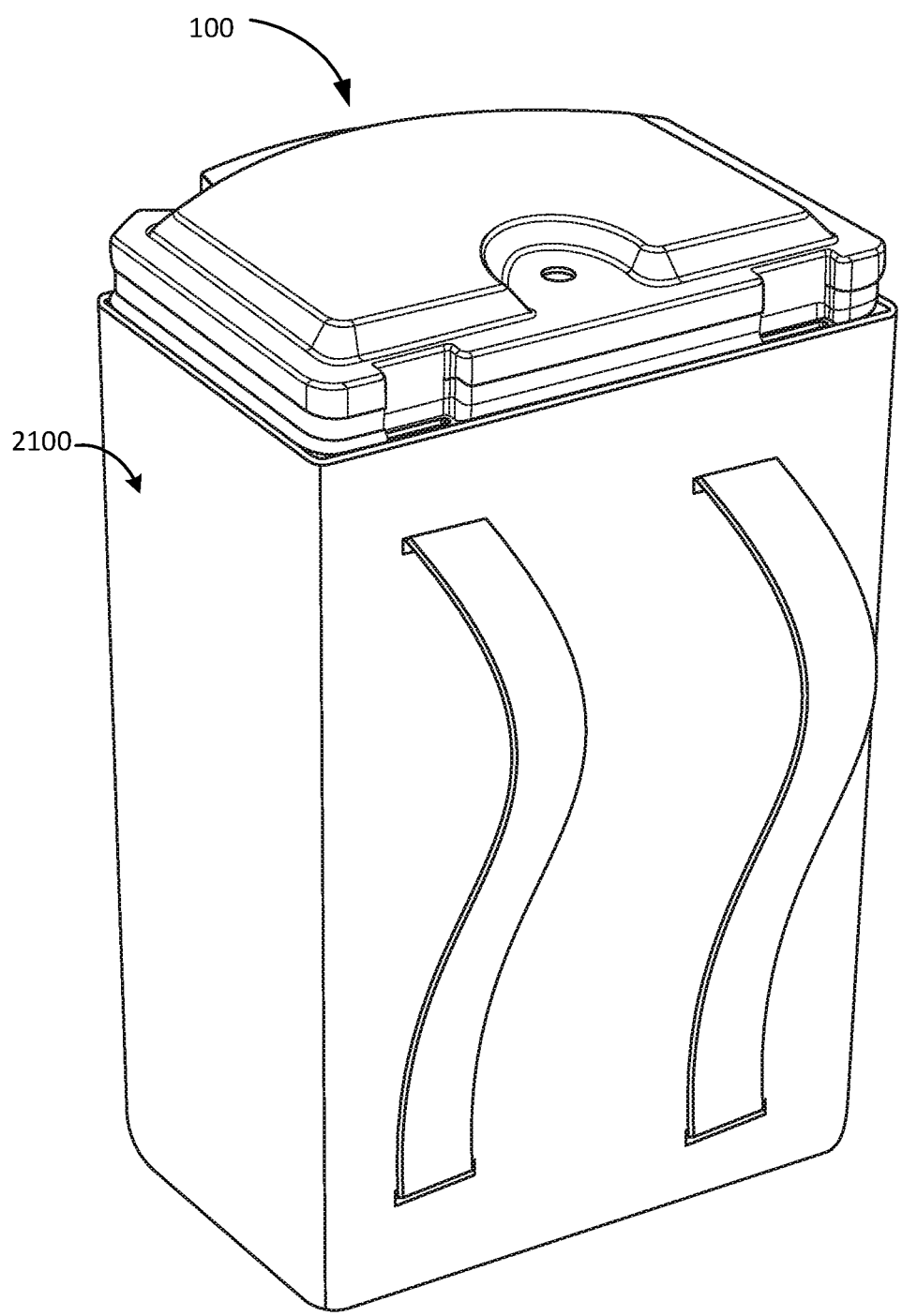
FIG. 22 is an illustration of a rearward perspective view of an example of a multipurpose tool and storage device that has been stowed within a bag that is configured with skids.
Figure 23:
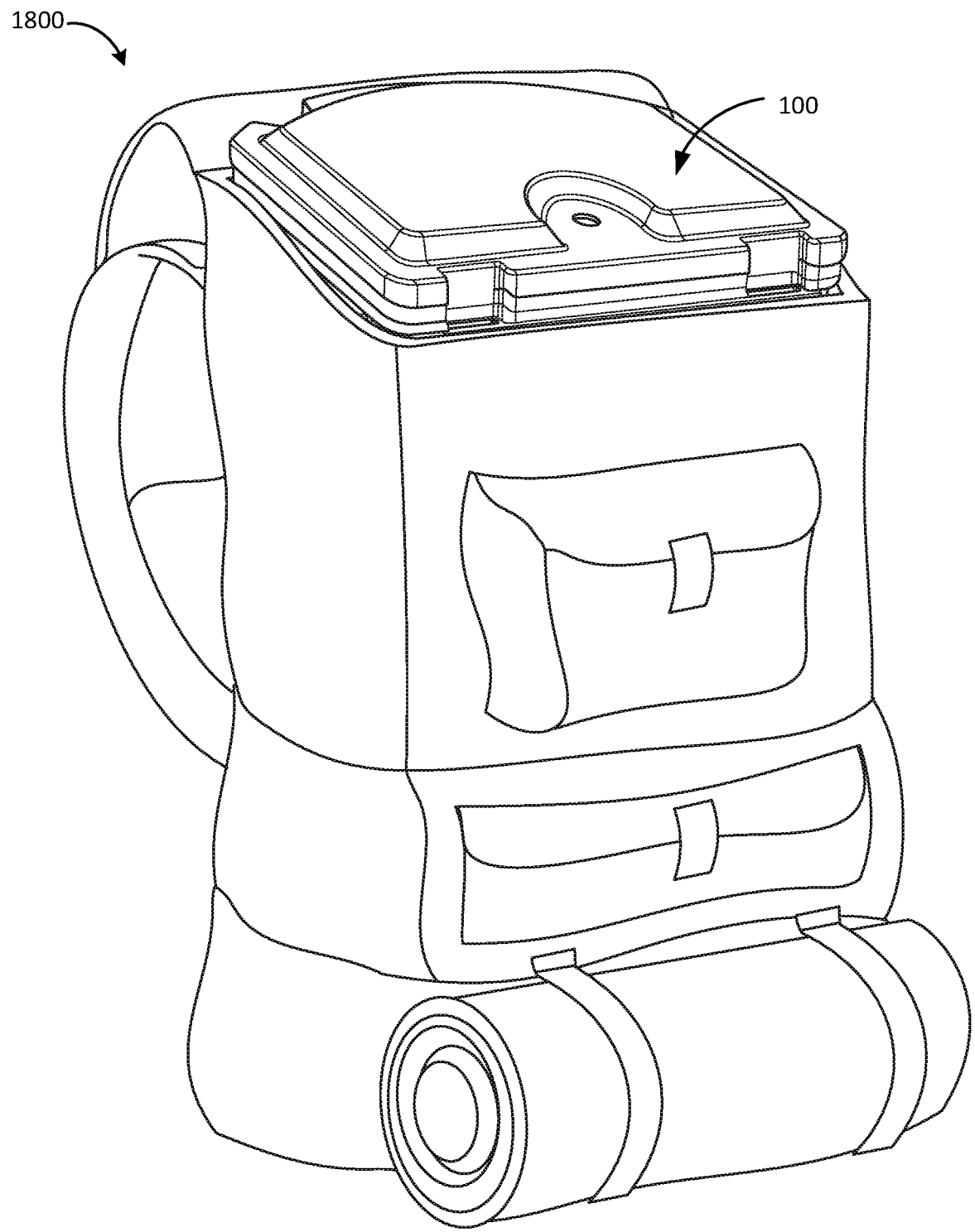
FIG. 23 is an illustration of a forward perspective view of an example of a multipurpose tool and storage device that has been stowed within a bag that is configured with skids.

FIG. 21 is an example of a bag 2100 that has been configured with skids 2110, 2120 to facilitate stowing of a multipurpose tool 100 and storage device within the bag 2100. The multipurpose tool 100 can be moved toward the bag 2100 and the sidewall portions 130, 120 of the multipurpose tool which can be of a material such as plastic can contact the respective skids 2110, 2120 and then the multipurpose tool can use the skids 2110, 2120 as a guide to slide into the bag 2100. Other features of the multipurpose tool can be configured to enable a smooth insertion into the bag 2100 to reduce friction and avoid snags. For example, the each of the edges of the multipurpose tool 100 can be rounded, smoothed and not sharp. By way of another example, the multipurpose tool 100 can include stowed leg supports 2130, 2140 that serve as a platform upon which the bottom of stowed legs 910, 920, 930, 940 can rest and extend beyond the stowed legs 910, 920, 930, 940 so that the stored legs 910, 920, 930, 934 do not snag on the bag 2100. The combination of the bag 2100 and the multipurpose tool 100 function as a backpack system that can add versatility to a person pack carrying needs.

FIG. 24 is a rearward perspective view of a first sidewall portion of an example of a multipurpose tool and storage device with legs stowed that includes a channel for mating with skids of a bag. In this example, the multipurpose tool 100 is configured to include channels 122 on each respective sidewall portion 120, 130. These channels can be configured to mate with certain skids in a bag. For example, in some implementations, a bag can include skids that are "T-shaped." In such instances, the top of the "T-shaped" skid can be slid into the channel and the multipurpose tool 100 can slide down the "T-shaped" channel. When it is time to remove the multipurpose tool 100, the multipurpose tool can be slid up the "T-shaped" track.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Thus, though particular embodiments of the subject matter have been described, these, and other embodiments, may also fall within the scope of the following claims.

The invention claimed is:

1. A container for insertion into a bag that comprises:
   a frontward wall portion;
   a rearward wall portion;
   a first sidewall portion;
   a second sidewall portion;
   an inner bottom surface of the container; and
   two leg storage compartments that are each configured to stow two removable legs of the container, wherein each leg storage compartment of the plurality of leg storage compartments comprises a plurality of staggered leg storage tabs configured to releasably secure at least two legs in a channel between a terminating end of the rearward wall portion and a terminating end of at least one of the first sidewall portion or the second sidewall portion, wherein a lid of the container forms a top surface of the channel, wherein the channel is configured to house two legs of the container beneath the surface of the terminating sidewall portions using the plurality of staggered leg storage tabs to engage at least one of the housed legs, thereby storing the at least two legs in a manner that enables the container to be inserted into the bag when storing the at least two legs within the channel using the plurality of staggered leg storage tabs without respective ends of the at least two legs getting caught on the bag.

2. The container of claim 1, wherein the frontward wall portion includes a plurality of leg openings that are each configured to receive an end of a removable leg.

3. The container of claim 2, wherein each removable leg of the at least two removable legs extend more than 90 degrees away from a horizontal plane that runs perpendicular to the first sidewall portion and the second sidewall portion when at least one end of each respective removable leg is inserted in a leg opening of the plurality of leg openings.

4. The container of claim 2, wherein the plurality of openings includes four leg openings that are each configured to receive an end of a removable leg.

5. The container of claim 1, the container further comprising:
   an opening in the frontward wall portion that is configured to receive a water filtration device.

6. The container of claim 1, the container further comprising:
   an opening in the rearward wall portion that is configured to receive a water filtration device.

7. The container of claim 1, the container further comprising:
   an inner compartment between the inner bottom surface of the container and an outer bottom surface of the container that is configured to receive a water filtration device.

8. The container of claim 1,
   wherein the rearward wall portion includes a plurality of indentations, and
   wherein each indentation of the plurality of indentations houses a coupling unit that is configured to receive a strap.

9. The container of claim 8,
   wherein a first indentation of the plurality of indentations and a second indentation of the plurality of indentations are proximate to a top of the rearward wall portion and spaced a first distance apart,
   wherein a third indentation of the plurality of indentations and a fourth indentation of the plurality of indentations are proximate to a bottom of the rearward wall portion and spaced a second distance apart.

10. The container of claim 9, wherein the first distance and the second distance are the same distance.

11. The container of claim 1, wherein at least one inward facing sidewall on the inside of the container includes at least one skid.

* * * * *